(12) United States Patent
Duan et al.

(10) Patent No.: US 11,456,836 B2
(45) Date of Patent: Sep. 27, 2022

(54) IMPLICIT SIGNALING OF LARGE-SCALE CHANNEL PROPERTIES ACROSS MULTIPLE TRACKING REFERENCE SIGNAL TRANSMISSIONS

(71) Applicant: QUALCOMM Incorporated, San Diego, CA (US)

(72) Inventors: Weimin Duan, San Diego, CA (US); Alexandros Manolakos, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 61 days.

(21) Appl. No.: 17/061,396

(22) Filed: Oct. 1, 2020

(65) Prior Publication Data
US 2021/0105106 A1 Apr. 8, 2021

(30) Foreign Application Priority Data
Oct. 2, 2019 (GR) .............................. 20190100428

(51) Int. Cl.
*H04L 5/00* (2006.01)
*H04W 72/04* (2009.01)
*H04L 27/26* (2006.01)

(52) U.S. Cl.
CPC .......... *H04L 5/005* (2013.01); *H04L 27/2657* (2013.01); *H04L 27/2675* (2013.01); *H04W 72/042* (2013.01); *H04W 72/0446* (2013.01)

(58) Field of Classification Search
CPC ............................ H04L 5/0094; H04B 7/0626
See application file for complete search history.

(56) References Cited

U.S. PATENT DOCUMENTS

| | | | |
|---|---|---|---|
| 2019/0116012 A1 | 4/2019 | Nam et al. | |
| 2020/0169363 A1* | 5/2020 | Talarico | ................ H04W 48/08 |
| 2020/0351892 A1* | 11/2020 | Yi | ......................... H04L 5/0092 |

(Continued)

OTHER PUBLICATIONS

International Search Report and Written Opinion—PCT/US2020/054073—ISA/EPO—dated Jan. 21, 2021.

(Continued)

*Primary Examiner* — Ayaz R Sheikh
*Assistant Examiner* — Debebe A Asefa
(74) *Attorney, Agent, or Firm* — Holland & Hart LLP

(57) ABSTRACT

Methods, systems, and devices for wireless communications are described that provide for multiple instances of aperiodic tracking reference signals (TRSs) that use a same set of large-scale channel properties. If two or more aperiodic TRS transmissions are triggered by downlink control information from a base station with a same transmission configuration indicator (TCI) state, a UE that receives the two or more aperiodic TRS transmissions may measure the multiple instances of the aperiodic TRS transmissions assuming that the same large scale parameters or properties can be inferred from each of the aperiodic TRS transmissions. The UE may then update one or more time tracking parameters, frequency tracking parameters, or combinations thereof, based on the same large scale transmission parameters being used for the multiple instances of the aperiodic TRS transmissions.

30 Claims, 17 Drawing Sheets

(56) References Cited

U.S. PATENT DOCUMENTS

2021/0167911 A1* 6/2021 Xiao ................ H04L 5/001
2021/0329517 A1* 10/2021 Noh ................ H04L 1/0026

OTHER PUBLICATIONS

Qualcomm Incorporated: "Remaining Issues on TRS", 3GPP Draft, R1-1804795, 3GPP TSG RAN WG1 Meeting #92bis, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427062, pp. 1-3, Retrieved from the Internet: URL:http://www.3gpp.org/ftp/Meetings%5F3GPP%5FSYNC/RAN1/Dos/ [retrieved on Apr. 15, 2018] the Whole Document.
ZTE: "Leftover Issues on Aperiodic CSI-RS", 3GPP Draft, R1-1904029, 3GPP TSG RAN WG1 Meeting #96bis, Leftover Issues on Aperiodic CSI-RS, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Mar. 30, 2019 (Mar. 30, 2019), XP051691243, 4 Pages. Retrieved from the Internet: URL:http://www.3gpp.org/ftp/tsg%5Fran/WG1%5FRL1/TSGR1%5F96b/Docs/R1%2D1904029%2Ezip [retrieved on Mar. 30, 2019] p. 2.

* cited by examiner

IMPLICIT SIGNALING OF LARGE-SCALE CHANNEL PROPERTIES ACROSS MULTIPLE TRACKING REFERENCE SIGNAL TRANSMISSIONS

CROSS REFERENCE

The present Application for patent claims the benefit of Greece Provisional Patent Application No. 20190100428 by DUAN et al., entitled "IMPLICIT SIGNALING OF LARGE-SCALE CHANNEL PROPERTIES ACROSS MULTIPLE TRACKING REFERENCE SIGNAL TRANSMISSIONS," filed Oct. 2, 2019, assigned to the assignee hereof, and expressly incorporated by reference herein.

BACKGROUND

The following relates generally to wireless communications, and more specifically to implicit signaling of large-scale channel properties across multiple tracking reference signal transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may use various configurations to support wireless transmissions/receptions. For example, beam configurations may be used to select or otherwise identify various parameters to be used for wireless communications employing beamforming (e.g., millimeter wave (mmW) communications). Beam configurations may include spatial relation information for uplink resources, or quasi-colocated (QCL) information for downlink resources. Beam configurations may include, for example, beam direction, beam identifier, spatial stream, and the like. Beam configurations may include transmit beam configurations and receive beam configurations, and the transmitters and receivers may update beam configurations in response to changes in channel conditions. Reference signals transmitted between devices may be used to update beam configurations, and the devices may use channel reciprocity to update transmit beam configurations based on a receive beam configuration determined for a reference signal. Further, some reference signals transmitted between devices may be used for time/frequency tracking at a UE to allow for time tracking loops and/or frequency tracking loops to be maintained. Such reference signals may include periodic reference signals, aperiodic reference signals, or combinations thereof. However, changes to beam configurations used for reference signal transmissions may impact beam parameters derived from measurements of the reference signals. Thus, efficient determination of beam configurations for reference signal transmissions may enhance the efficiency and reliability of communications.

SUMMARY

The described techniques relate to improved methods, systems, devices, and apparatuses that support implicit signaling of large-scale channel properties across multiple tracking reference signal transmissions. Various described techniques provide for multiple instances of one or more aperiodic tracking reference signals that are transmitted using a same set of large-scale channel properties that are separate from large scale parameters of one or more periodic reference signals. In some cases, two or more aperiodic tracking reference signals may be triggered by downlink control information from a base station that indicates a same transmission configuration indicator state for slots containing the two or more aperiodic tracking reference signals. A UE that receives the two or more aperiodic tracking reference signals may measure the multiple instances of the aperiodic tracking reference signals assuming that the same large scale parameters or properties (e.g., quasi co-location (QCL) parameters) can be inferred from each of the aperiodic tracking reference signals. The UE may then update one or more time tracking parameters, frequency tracking parameters, or combinations thereof, based on the same large scale transmission parameters being used for the multiple instances of the aperiodic tracking reference signal. Such techniques may enhance the reliability of time/frequency tracking at the UE, and also provide processing gain at the UE through the application of the same large scale parameters across multiple instances of a reference signal.

A method of wireless communication at a UE is described. The method may include receiving, from a base station, downlink control information that includes a first transmission configuration indicator state for at least a first slot, and that includes a trigger for an aperiodic tracking reference signal in at least the first slot, measuring a first instance of the aperiodic tracking reference signal in the first slot and a second instance of the aperiodic tracking reference signal in the first slot or a second slot, and updating one or more time tracking parameters, frequency tracking parameters, or combinations thereof based on a same first set of large scale transmission parameters being used for at least the first instance of the aperiodic tracking reference signal and the second instance of the aperiodic tracking reference signal.

An apparatus for wireless communication at a UE is described. The apparatus may include a processor, memory coupled with the processor, and instructions stored in the memory. The instructions may be executable by the processor to cause the apparatus to receive, from a base station, downlink control information that includes a first transmission configuration indicator state for at least a first slot, and that includes a trigger for an aperiodic tracking reference signal in at least the first slot, measure a first instance of the aperiodic tracking reference signal in the first slot and a second instance of the aperiodic tracking reference signal in the first slot or a second slot, and update one or more time tracking parameters, frequency tracking parameters, or combinations thereof based on a same first set of large scale transmission parameters being used for at least the first instance of the aperiodic tracking reference signal and the second instance of the aperiodic tracking reference signal.

Another apparatus for wireless communication at a UE is described. The apparatus may include means for receiving, from a base station, downlink control information that includes a first transmission configuration indicator state for at least a first slot, and that includes a trigger for an aperiodic tracking reference signal in at least the first slot, measuring a first instance of the aperiodic tracking reference signal in the first slot and a second instance of the aperiodic tracking reference signal in the first slot or a second slot, and updating one or more time tracking parameters, frequency tracking parameters, or combinations thereof based on a same first set of large scale transmission parameters being used for at least the first instance of the aperiodic tracking reference signal and the second instance of the aperiodic tracking reference signal.

A non-transitory computer-readable medium storing code for wireless communication at a UE is described. The code may include instructions executable by a processor to receive, from a base station, downlink control information that includes a first transmission configuration indicator state for at least a first slot, and that includes a trigger for an aperiodic tracking reference signal in at least the first slot, measure a first instance of the aperiodic tracking reference signal in the first slot and a second instance of the aperiodic tracking reference signal in the first slot or a second slot, and update one or more time tracking parameters, frequency tracking parameters, or combinations thereof based on a same first set of large scale transmission parameters being used for at least the first instance of the aperiodic tracking reference signal and the second instance of the aperiodic tracking reference signal.

In some examples of the method, apparatuses, and non-transitory computer-readable medium described herein, the first transmission configuration indicator state indicates the first set of large scale transmission parameters.

Some examples of the method, apparatuses, and non-transitory computer-readable medium described herein may further include operations, features, means, or instructions for receiving configuration information from the base station that includes a configuration for a periodic tracking reference signal, where a second transmission configuration indicator state that indicates a second set of large scale transmission parameters for the periodic tracking reference signal is semi-statically indicated by the base station, and where the second set of large scale transmission parameters is different than the first set of large scale transmission parameters. In some examples of the method, apparatuses, and non-transitory computer-readable medium described herein, the second transmission configuration indicator state is semi-statically indicated in one or more periodic synchronization signal blocks. In some examples of the method, apparatuses, and non-transitory computer-readable medium described herein, the first set of large scale transmission parameters include quasi co-location (QCL) parameters that are used for the first instance of the aperiodic tracking reference signal and the second instance of the aperiodic tracking reference signal.

In some examples of the method, apparatuses, and non-transitory computer-readable medium described herein, the downlink control information may be received in a first downlink control information transmission in a first downlink control channel monitoring occasion of the first slot that triggers the first instance of the aperiodic tracking reference signal and in a second downlink control information transmission in a second downlink control channel monitoring occasion of the second slot that triggers the second instance of the aperiodic tracking reference signal within the second slot. In some examples of the method, apparatuses, and non-transitory computer-readable medium described herein, the aperiodic tracking reference signal may be a first aperiodic tracking reference signal, and where the downlink control information further triggers one or more additional instances of the first aperiodic tracking reference signal or one or more other aperiodic tracking reference signals.

In some examples of the method, apparatuses, and non-transitory computer-readable medium described herein, the first downlink control information transmission and the second downlink control information transmission both indicate the first transmission configuration indicator state, and where the UE assumes the first set of large scale transmission parameters is used for both the first instance of the aperiodic tracking reference signal and the second instance of the aperiodic tracking reference signal when measuring the aperiodic tracking reference signal.

In some examples of the method, apparatuses, and non-transitory computer-readable medium described herein, the downlink control information may be received in a first downlink control information transmission in a downlink control channel monitoring occasion of the first slot that triggers the first instance of the aperiodic tracking reference signal and the second instance of the aperiodic tracking reference signal within the second slot. In some examples of the method, apparatuses, and non-transitory computer-readable medium described herein, the downlink control information is received in both a first downlink control information transmission and a second downlink control information transmission that are transmitted in one or more of a first downlink control channel monitoring occasion or a second downlink control channel monitoring occasion. In some examples of the method, apparatuses, and non-transitory computer-readable medium described herein, the first downlink control information transmission and the second downlink control information transmission are both received in the first downlink control channel monitoring occasion. In some examples of the method, apparatuses, and non-transitory computer-readable medium described herein, the first downlink control information transmission is received in the first downlink control channel monitoring occasion and the second downlink control information transmission is received in the second downlink control channel monitoring occasion that is consecutive to the first downlink control channel monitoring occasion.

In some examples of the method, apparatuses, and non-transitory computer-readable medium described herein, the first downlink control information transmission is received in the first downlink control channel monitoring occasion and the second downlink control information transmission is received in the second downlink control channel monitoring occasion that is non-consecutive to the first downlink control channel monitoring occasion, and where both the first downlink control channel monitoring occasion and the second downlink control channel monitoring occasion are in the first slot.

A method of wireless communication at a base station is described. The method may include transmitting, to a UE, downlink control information that includes a first transmission configuration indicator state for at least a first slot, and that includes a trigger for an aperiodic tracking reference signal in at least the first slot and a second slot, transmitting a first instance of the aperiodic tracking reference signal in the first slot and a second instance of the aperiodic tracking reference signal in the second slot, where a same first set of large scale transmission parameters is used for both the first instance of the aperiodic tracking reference signal and the second instance of the aperiodic tracking reference signal, and receiving a feedback report that includes one or more parameters that are determined based on the first instance of the aperiodic tracking reference signal and the second instance of the aperiodic tracking reference signal.

An apparatus for wireless communication at a base station is described. The apparatus may include a processor, memory coupled with the processor, and instructions stored in the memory. The instructions may be executable by the processor to cause the apparatus to transmit, to a UE, downlink control information that includes a first transmission configuration indicator state for at least a first slot, and that includes a trigger for an aperiodic tracking reference signal in at least the first slot and a second slot, transmit a first instance of the aperiodic tracking reference signal in the first slot and a second instance of the aperiodic tracking reference signal in the second slot, where a same first set of large scale transmission parameters is used for both the first instance of the aperiodic tracking reference signal and the second instance of the aperiodic tracking reference signal, and receive a feedback report that includes one or more parameters that are determined based on the first instance of the aperiodic tracking reference signal and the second instance of the aperiodic tracking reference signal.

Another apparatus for wireless communication at a base station is described. The apparatus may include means for transmitting, to a UE, downlink control information that includes a first transmission configuration indicator state for at least a first slot, and that includes a trigger for an aperiodic tracking reference signal in at least the first slot and a second slot, transmitting a first instance of the aperiodic tracking reference signal in the first slot and a second instance of the aperiodic tracking reference signal in the second slot, where a same first set of large scale transmission parameters is used for both the first instance of the aperiodic tracking reference signal and the second instance of the aperiodic tracking reference signal, and receiving a feedback report that includes one or more parameters that are determined based on the first instance of the aperiodic tracking reference signal and the second instance of the aperiodic tracking reference signal.

A non-transitory computer-readable medium storing code for wireless communication at a base station is described. The code may include instructions executable by a processor to transmit, to a UE, downlink control information that includes a first transmission configuration indicator state for at least a first slot, and that includes a trigger for an aperiodic tracking reference signal in at least the first slot and a second slot, transmit a first instance of the aperiodic tracking reference signal in the first slot and a second instance of the aperiodic tracking reference signal in the second slot, where a same first set of large scale transmission parameters is used for both the first instance of the aperiodic tracking reference signal and the second instance of the aperiodic tracking reference signal, and receive a feedback report that includes one or more parameters that are determined based on the first instance of the aperiodic tracking reference signal and the second instance of the aperiodic tracking reference signal.

In some examples of the method, apparatuses, and non-transitory computer-readable medium described herein, the first transmission configuration indicator state indicates the first set of large scale transmission parameters.

Some examples of the method, apparatuses, and non-transitory computer-readable medium described herein may further include operations, features, means, or instructions for transmitting configuration information to the UE that includes a configuration for a periodic tracking reference signal, where a second transmission configuration indicator state that indicates a second set of large scale transmission parameters for the periodic tracking reference signal is semi-statically indicated to the UE, and where the second set of large scale transmission parameters is different than the first set of large scale transmission parameters. In some examples of the method, apparatuses, and non-transitory computer-readable medium described herein, the second transmission configuration indicator state may be semi-statically indicated in one or more periodic synchronization signal blocks. In some examples of the method, apparatuses, and non-transitory computer-readable medium described herein, the first set of large scale transmission parameters include quasi co-location (QCL) parameters that may be used for the first instance of the aperiodic tracking reference signal and the second instance of the aperiodic tracking reference signal.

In some examples of the method, apparatuses, and non-transitory computer-readable medium described herein, the downlink control information may be transmitted in a first downlink control information transmission in a first downlink control channel monitoring occasion of the first slot that triggers the first instance of the aperiodic tracking reference signal and the second instance of the aperiodic tracking reference signal. In some examples of the method, apparatuses, and non-transitory computer-readable medium described herein, the aperiodic tracking reference signal may be a first aperiodic tracking reference signal, and where the downlink control information is further transmitted in a second downlink control information transmission in a second downlink control channel monitoring occasion of the second slot that triggers one or more instances of a second aperiodic tracking reference signal in one or other slots.

In some examples of the method, apparatuses, and non-transitory computer-readable medium described herein, the first downlink control information transmission and the second downlink control information transmission both indicate the first transmission configuration indicator state, and where the UE assumes the first set of large scale transmission parameters is used for both the first aperiodic tracking reference signal and the second aperiodic tracking reference signal when measuring the first aperiodic tracking reference signal and the second aperiodic tracking reference signal. In some examples of the method, apparatuses, and non-transitory computer-readable medium described herein, the downlink control information may be transmitted in a first downlink control information transmission in a downlink control channel monitoring occasion of the first slot that triggers the first instance of the aperiodic tracking reference signal and the second instance of the aperiodic tracking reference signal within the second slot.

In some examples of the method, apparatuses, and non-transitory computer-readable medium described herein, the downlink control information is transmitted in both a first downlink control information transmission and a second downlink control information transmission that is provided in one or more downlink control channel monitoring occasions of one or more slots. In some examples of the method, apparatuses, and non-transitory computer-readable medium described herein, the first downlink control information transmission and the second downlink control information transmission are both provided in the first downlink control channel monitoring occasion. In some examples of the method, apparatuses, and non-transitory computer-readable medium described herein, the first downlink control information transmission is provided in a first downlink control channel monitoring occasion and the second downlink control information transmission is provided in a second downlink control channel monitoring occasion that is consecutive to the first downlink control channel monitoring occasion. In some examples of the method, apparatuses, and non-transitory computer-readable medium described herein, the first downlink control information transmission is provided in a first downlink control channel monitoring occasion and the second downlink control information transmission is provided in a second downlink control channel monitoring occasion that is non-consecutive to the first downlink control channel monitoring occasion, and where both the first downlink control channel monitoring occasion and the second downlink control channel monitoring occasion are in the first slot.

DETAILED DESCRIPTION

Figure 1:
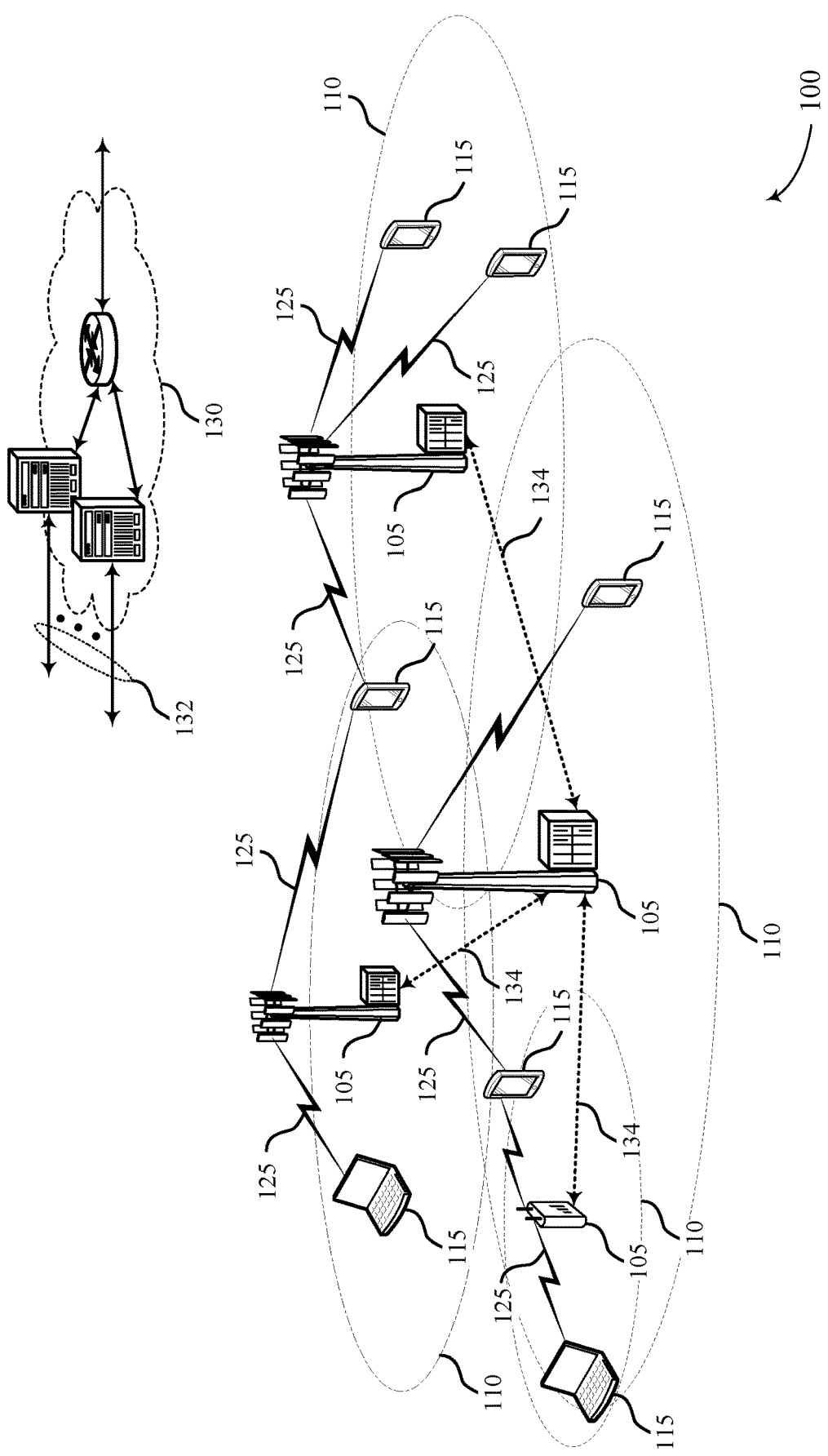
FIG. 1 illustrates an example of a system for wireless communications that supports implicit signaling of large-scale channel properties across multiple tracking reference signal transmissions in accordance with aspects of the present disclosure.

Various aspects of the present disclosure provide for multiple instances of one or more aperiodic tracking reference signals (TRSs) that are transmitted with a same set of large-scale channel properties that are separate from large scale parameters of one or more periodic reference signals. In some cases a base station may trigger a measurement report at a user equipment (UE) based on one or more aperiodic TRSs through one or more control channel transmissions (e.g., a physical downlink control channel (PDCCH) transmission). Based on the received trigger, the UE may identify resources for the aperiodic TRS(s) (e.g., one or more symbols within one or more slots that contain a channel state information reference signal (CSI-RS)), and may perform one or more measurements on the identified resources that may be used to update one or more time tracking parameters, frequency tracking parameters, or combinations thereof. In some cases, one or more triggers may be transmitted by the base station in downlink control information (DCI), which may also indicate a transmission configuration indicator (TCI) state (e.g., that provides quasi co-location (QCL) relationships for downlink reference signals). In accordance with various techniques discussed herein, the UE may assume that the same large scale parameters (e.g., quasi co-location parameters) can be inferred from each of the two or more instances of the one or more aperiodic TRSs that are triggered by DCI with a same TCI state.

Such large scale parameters may be a first set of large scale that are different than a second set of large scale parameters that are configured for one or more periodic reference signals. For example, in some existing systems aperiodic TRS large scale parameters may be tied to periodic TRS large scale parameters. The periodic TRS large scale parameters may have a QCL source that can be a synchronization signal block (SSB) (e.g., for QCL Type-C or QCL Type-D parameters), or a SSB (e.g., for QCL Type-C parameters) and a CSI-RS for beam management (e.g., for QCL Type-D parameters). Thus, in such systems, the aperiodic TRS large scale parameters are determined based on periodic TRS large scale parameters that are semi-statically provided by SSB transmissions, CSI-RS for beam management transmissions, or both. However, in some cases using large scale parameters associated with periodic TRS for aperiodic TRS may not provide a well-matched QCL reference for data transmissions (e.g., physical downlink shared channel (PDSCH) transmissions). For example, periodic TRS may have relatively wide beams while PDSCH transmissions may use relatively narrow beams, which may result in large scale parameter mismatches (e.g., spatial, doppler, and/or delay profile mismatches). Further, for fast beam changes (e.g., when the UE has high mobility) a limited number of periodic TRSs may be configured for a component carrier, and configuring additional periodic TRSs consumes additional system overhead and reduce system efficiency. Further, if standalone aperiodic TRS configurations are provided, additional overhead would be needed.

Techniques as discussed herein allow for implicit signaling of the large scale parameters of one or more aperiodic TRSs, and may thus allow for efficient aperiodic TRS configuration with relatively low overhead that provides a better matching of large scale parameters (e.g., QCL parameters) for PDSCH transmissions and processing gains that result from a same set of large scale parameters being used for multiple instances of TRSs. Such better matched large scale parameters may enhance the likelihood of successful receptions of data communications and thus enhance system latency (e.g., through fewer retransmissions), efficiency and reliability.

Aspects of the disclosure are initially described in the context of a wireless communications system. Additional aspects are described with respect to exemplary slots with corresponding DCI and AP-TRS transmissions. Aspects of the disclosure are further illustrated by and described with reference to apparatus diagrams, system diagrams, and flowcharts that relate to implicit signaling of large-scale channel properties across multiple tracking reference signal transmissions.

FIG. 1 illustrates an example of a wireless communications system 100 that supports implicit signaling of large-scale channel properties across multiple tracking reference signal transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, a base station 105 may transmit one or more TRSs that may be measured at one or more UEs 115, which may include one or more aperiodic TRSs. In some cases, multiple instances of the one or more aperiodic TRSs may be transmitted using a same set of large-scale channel properties that are implicitly indicated by a TCI state of one or more DCIs that trigger multiple instances of the aperiodic TRS(s). In some cases, if two or more aperiodic tracking reference signals are triggered by DCI that indicates a same TCI state for slots containing the two or more instances of aperiodic TRS(s), a UE 115 that receives the aperiodic TRS(s) may measure the multiple instances of the aperiodic TRS(s) assuming that the same large scale parameters or properties can be inferred from the aperiodic TRS(s). The UE 115 may then update one or more time tracking parameters (e.g., in a time tracking loop), frequency tracking parameters (e.g., in a frequency tracking loop), or combinations thereof based on one or more parameters that are measured based on the same large scale transmission parameters being used for the multiple instances of the aperiodic TRS(s).

Figure 2:
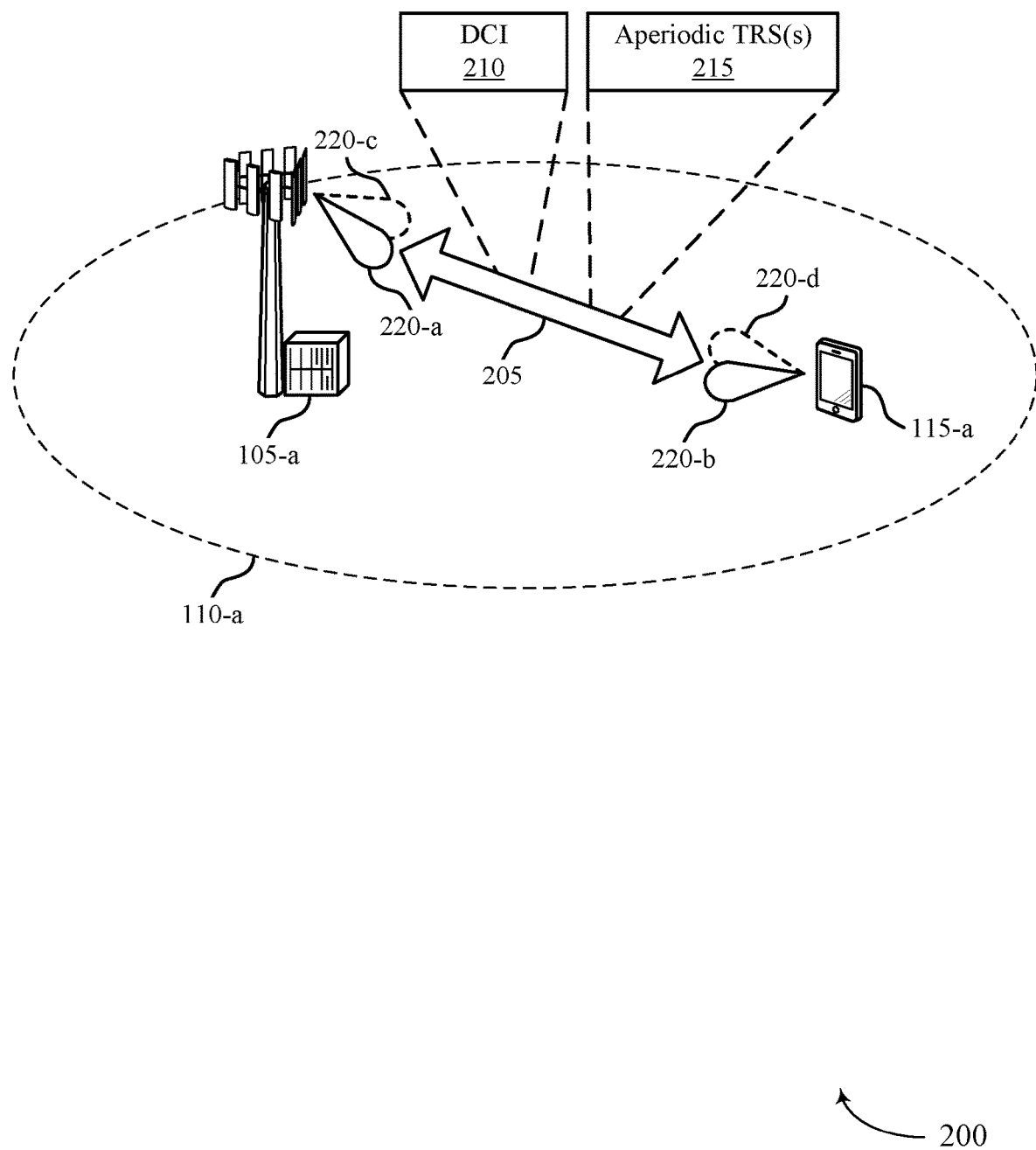
FIG. 2 illustrates an example of a portion of a wireless communications system that supports implicit signaling of large-scale channel properties across multiple tracking reference signal transmissions in accordance with aspects of the present disclosure.

FIG. 2 illustrates an example of a wireless communications system 200 that supports implicit signaling of large-scale channel properties across multiple tracking reference signal transmissions in accordance with aspects of the present disclosure. In some examples, wireless communications system 200 may implement aspects of wireless communications system 100. The wireless communications system 200 may include base station 105-*a* and UE 115-*a*, which may be examples of the corresponding devices described with reference to FIG. 1. Base station 105-*a* may provide network coverage for a geographic coverage area 110-*a*. UE 115-*a* and base station 105-*a* may communicate over a communication link 205 according to a beam configuration between UE 115-*a* and base station 105-*a*. A beam configuration may refer to any spatial relation information or QCL information indicating beam resources, such as a beam direction, a beam width, a beam identifier (ID), a spatial stream, etc. In certain examples, a beam configuration may be referred to as a beam indication, a beam indication of resources, or some similar terminology. In some cases, to update the beam configuration, either UE 115-*a* or base station 105-*a* may transmit an aperiodic TRS 215, such as an aperiodic CSI-RS, an aperiodic sounding reference signal (transmitted from the UE 115-*a*), or any other relevant reference signal for beam configuration.

The wireless communications system 200 may support updating QCL information of downlink resources (e.g., a beam configuration for a downlink transmit beam at base station 105-*a*, a downlink receive beam at UE 115-*a*, or both). Such updates to the downlink beam configuration may be performed based on an one or more aperiodic TRSs 215 transmitted by base station 105-*a*. While various examples discussed herein are related to downlink transmissions, techniques described herein can also be used on uplink communications based on one or more sounding reference signals (SRSs) transmitted by the UE 115-*a*). To trigger an aperiodic TRS 215, base station 105-*a* may transmit scheduling information in DCI 210 to UE 115-*a*. If the DCI 210 schedules an aperiodic TRS (e.g., an aperiodic CSI-RS), the DCI 210 may indicate a TCI for a scheduled downlink transmission (e.g., a PDSCH transmission), and in the case that two or more instances of an aperiodic TRS (e.g., two or more instances of one TRS, or one or more instances of two or more TRSs) being scheduled in DCI with a same TCI, the indicated TCI may be used for measurement of the instances of the aperiodic TRS transmissions.

Based on the aperiodic TRS, base station 105-*a* and UE 115-*a* may update a beam configuration for any downlink resources (e.g., downlink resources corresponding to an aperiodic CSI-RS, a PDCCH, a PDSCH, or any combination of these), such as one or more updates to time tracking parameters in a time tracking loop, one or more updates to frequency tracking parameters in a frequency tracking loop, or combinations thereof. In some cases, updating a beam configuration may involve updating from a first set of beams (e.g., beams 220-*a* and 220-*b*) for transmission and reception to a second set of beams (e.g., beams 220-*c* and 220-*d*) for improved transmission and reception. Various examples of DCIs and instances of aperiodic TRSs that may be assumed to use the same large scale parameters are illustrated in FIGS. 3 through 6.

Figure 3:
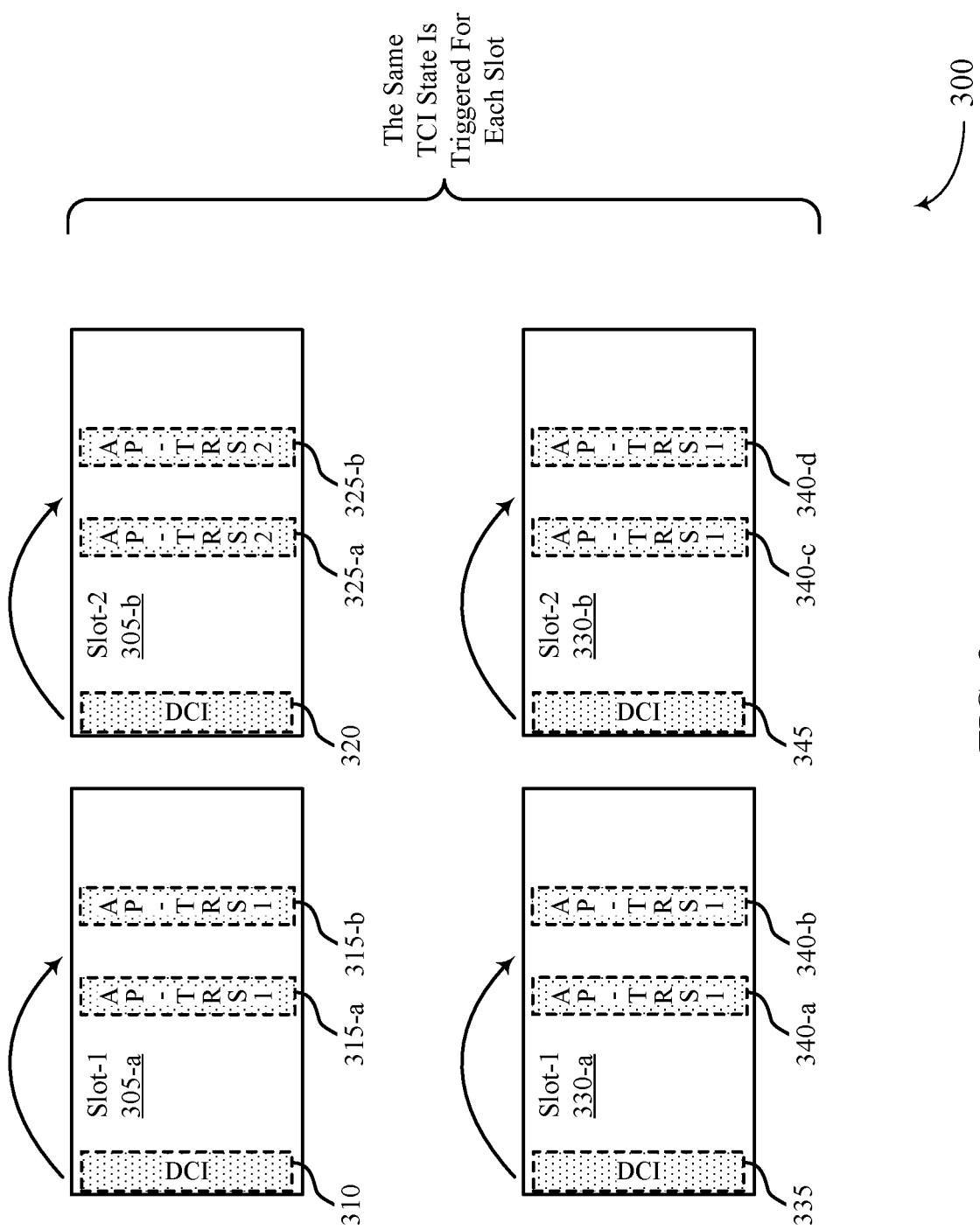
FIGS. 3 through 6 illustrate examples of slots with downlink control information and aperiodic reference signals that support implicit signaling of large-scale channel properties across multiple tracking reference signal transmissions in accordance with aspects of the present disclosure.

FIG. 3 illustrates an example of slots with downlink control information and aperiodic reference signals 300 that support implicit signaling of large-scale channel properties across multiple tracking reference signal transmissions in accordance with aspects of the present disclosure. In some examples, slots with downlink control information and aperiodic reference signals 300 may implement aspects of wireless communications system 100 or 200.

In this example, DCIs in different slots may trigger a same or different aperiodic TRS in the different slots, where the DCIs have a same TCI state. In one example, a first slot 305-*a* may include a first DCI 310 that triggers a first aperiodic TRS 315. In this example, the first aperiodic TRS 315 is transmitted in two symbols of the first slot 305-*a* that include a first symbol of first aperiodic TRS 315-*a* and a second symbol of first aperiodic TRS 315-*b*. A second slot 305-*b* may include a second DCI 320 that triggers a second aperiodic TRS 325 in a similar manner. In another example, a first slot 330-*a* may include a first DCI 335 that triggers a first aperiodic TRS 340 (e.g., that occupies two symbols of the first slot 330-*a* that include a first symbol of first aperiodic TRS 340-*a* and a second symbol of first aperiodic TRS 340-*b*). A second slot 330-*b*, in this example, may include a second DCI 345 that triggers another instance of the first aperiodic TRS 340 in a similar manner. In each case, the same TCI state is triggered for each slot, and the different instances of the aperiodic TRSs may be transmitted by the base station using a same set of large scale parameters that are indicated by the TCI.

Such techniques thus provide implicit signaling of the consistency of the large scale parameters/properties/statistics across multiple aperiodic TRS transmissions. Thus, if an aperiodic TRS or multiple aperiodic TRSs are triggered across multiple instances with the same TCI-state the UE may assume that the same large scale parameters/properties can be inferred from both aperiodic TRSs. In some cases, such as the examples of FIG. 3, aperiodic TRSs may be triggered from DCIs from PDCCH monitoring occasions from consecutive slots (e.g., when a TRS parameter is configured to provide a single slot TRS length). In other cases, the length of the TRS may span two slots that have a one-slot gap (e.g., when a TRS parameter is configured to provide a two slot TRS length), such as illustrated in FIG. 4.

Figure 4:
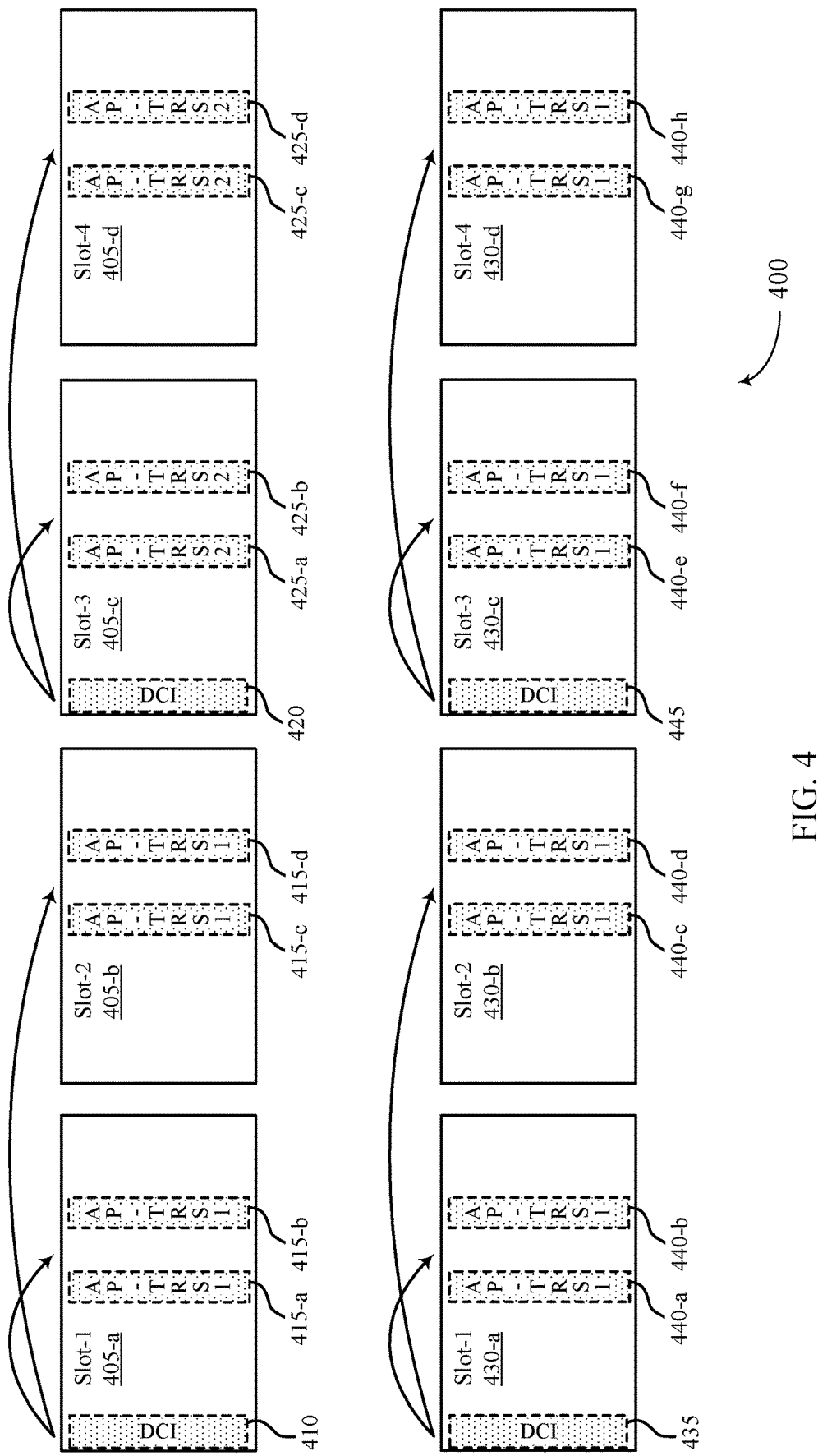

FIG. 4 illustrates an example of slots with downlink control information and aperiodic reference signals 400 that support implicit signaling of large-scale channel properties across multiple tracking reference signal transmissions in accordance with aspects of the present disclosure. In some examples, slots with downlink control information and aperiodic reference signals 400 may implement aspects of wireless communications system 100 or 200.

Again in this example, DCIs in different slots may trigger a same or different aperiodic TRS in the different slots, where the DCIs have a same TCI state. In one example, a first slot 405-*a* may include a first DCI 410 that triggers a first aperiodic TRS 415 that has a TRS burst length of two slots and thus spans the first slot 405-*a* and second slot 405-*b*. In this example, the first aperiodic TRS 415 is transmitted in two symbols of each of the first slot 405-*a* and second slot 405-*b* such that it includes a first symbol of first aperiodic TRS 415-*a*, a second symbol of first aperiodic TRS 415-*b*, a third symbol of first aperiodic TRS 415-*c*, and a fourth symbol of first aperiodic TRS 415-*d*. A third slot 405-*c* may include a second DCI 420 that triggers a second aperiodic TRS 425 that spans the third slot 405-*c* and fourth slot 405-*d* in a similar manner.

In another example, a first slot 430-*a* may include a first DCI 435 that triggers a first aperiodic TRS 440 (e.g., that occupies two symbols of the first slot 430-*a* and second slot 430-*b*, that include a first symbol of first aperiodic TRS 440-*a*, a second symbol of first aperiodic TRS 440-*b*, a third symbol of first aperiodic TRS 440-*c*, and a fourth symbol of first aperiodic TRS 440-*d*). A third slot 430-*c*, in this example, may include a second DCI 445 that triggers another instance of the first aperiodic TRS 440 that spans the third slot 430-*c* and fourth slot 430-*d* in a similar manner. In each case, the same TCI state is triggered for each slot, and the different instances of the aperiodic TRSs may be transmitted by the base station (and/or any other base station) using a same set of large scale channel properties. In other examples, such as illustrated in FIG. 5, an aperiodic TRS or multiple aperiodic TRSs may be triggered from one or multiple DCIs from the same or consecutive PDCCH monitoring occasions.

Thus, a UE that receives the aperiodic TRSs may measure the multiple instances of the aperiodic TRSs assuming that the same large scale parameters or properties can be inferred from the aperiodic TRSs. The UE may then update one or more time tracking parameters, frequency tracking parameters, or combinations thereof based on the same large scale transmission parameters being used for the multiple instances of the aperiodic TRSs.

Figure 5:
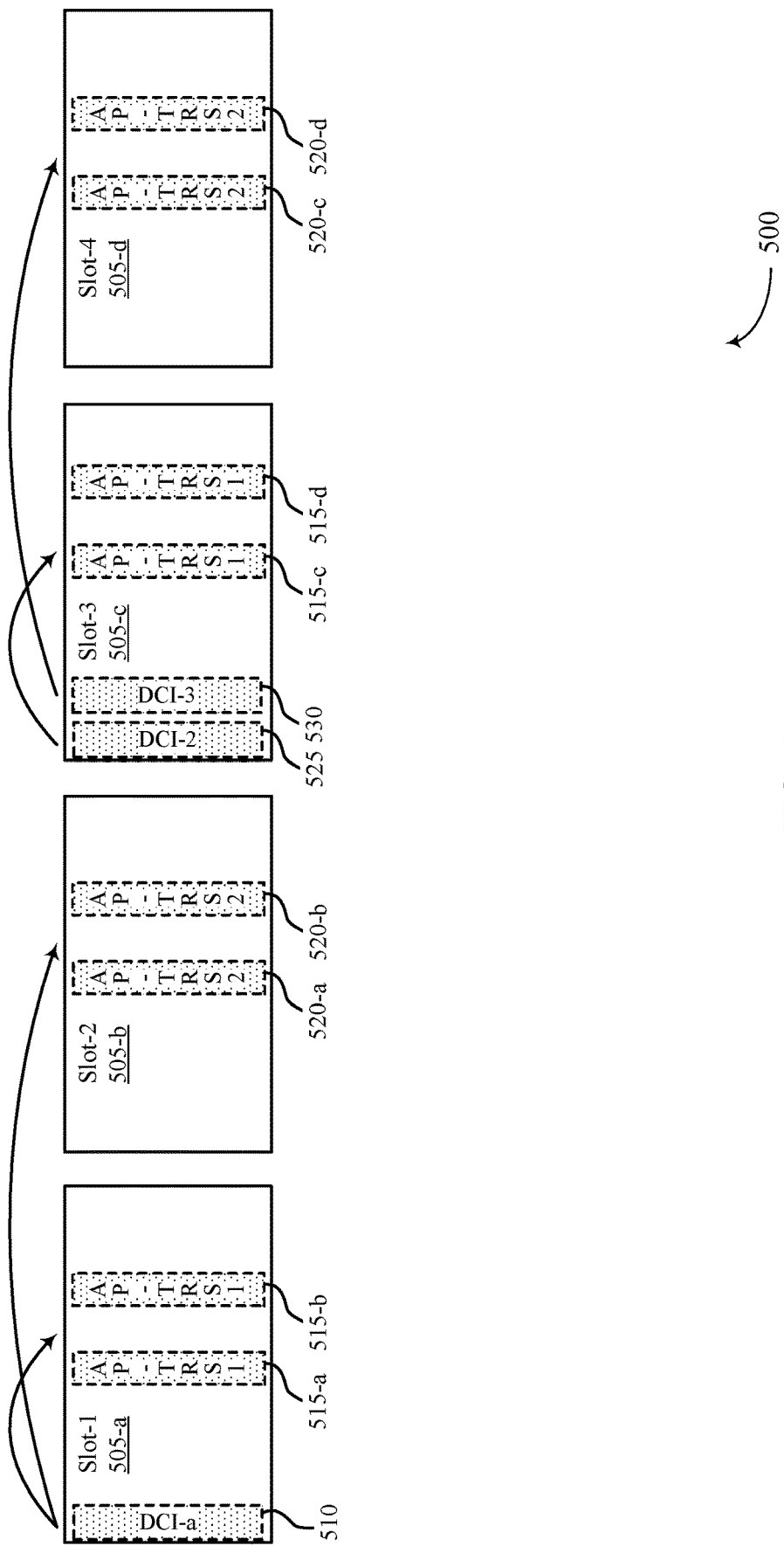

FIG. 5 illustrates an example of slots with downlink control information and aperiodic reference signals 500 that support implicit signaling of large-scale channel properties across multiple tracking reference signal transmissions in accordance with aspects of the present disclosure. In some examples, slots with downlink control information and aperiodic reference signals 500 may implement aspects of wireless communications system 100 or 200.

In this example, one or multiple DCIs from the same or consecutive PDCCH monitoring occasions may trigger multiple instances of aperiodic TRS transmissions, where the DCIs have a same TCI state. In this example, a first slot 505-*a* may include a first DCI 510 in a first DCI monitoring occasion that triggers a first aperiodic TRS 515 in the first slot 505-*a* and a second aperiodic TRS 520 in the second slot 505-*b*. In this example, each of the first aperiodic TRS 515 and the second aperiodic TRS 520 is transmitted in two symbols of each of the first slot 505-*a* and second slot 505-*b*). A third slot 505-*c* may include a second DCI 525 that triggers another instance of the first aperiodic TRS 515 in the third slot 505-*a*, and may include a third DCI 530 that triggers another instance of the second aperiodic TRS 520 in the fourth slot 505-*d*. The second DCI 525 and the third DCI 530 may be in consecutive PDCCH monitoring occasions.

Thus, a UE that receives the aperiodic TRSs may measure the multiple instances of the aperiodic TRSs assuming that the same large scale parameters or properties can be inferred from the aperiodic TRSs. The UE may then update one or more time tracking parameters, frequency tracking parameters, or combinations thereof based on the same large scale transmission parameters being used for the multiple instances of the aperiodic TRSs. In other examples, DCIs from multiple PDCCH monitoring occasions, that may be consecutive or non-consecutive, may trigger multiple instances of aperiodic TRS transmissions, such as is illustrated in FIG. 6.

Figure 6:
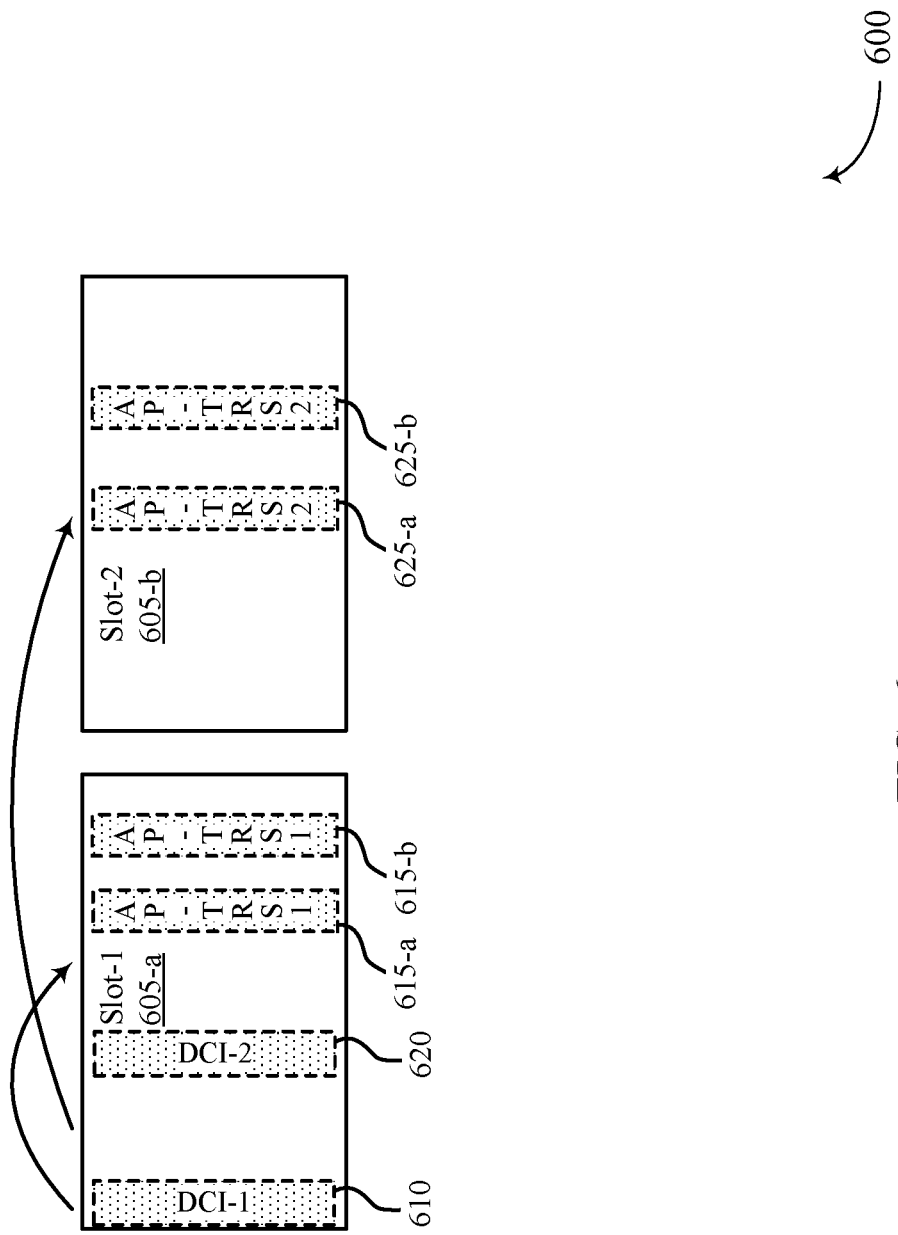

FIG. 6 illustrates an example of slots with downlink control information and aperiodic reference signals 600 that support implicit signaling of large-scale channel properties across multiple tracking reference signal transmissions in accordance with aspects of the present disclosure. In some examples, slots with downlink control information and aperiodic reference signals 600 may implement aspects of wireless communications system 100 or 200.

In this example, multiple DCIs from multiple PDCCH monitoring occasions (consecutive or non-consecutive) may trigger multiple instances of aperiodic TRS transmissions, where the DCIs have a same TCI state. In this example, a first slot 605-*a* may include a first DCI 610 in a first DCI monitoring occasion that triggers a first aperiodic TRS 615 in the first slot 605-*a*. The first slot 605-*a* may also include a second DCI 620 in a second DCI monitoring occasion, that is consecutive or non-consecutive with the first DCI monitoring occasion, that triggers a second aperiodic TRS 625 in the second slot 605-*b*.

Thus, a UE that receives the aperiodic TRSs may measure the multiple instances of the aperiodic TRSs assuming that the same large scale parameters or properties can be inferred from the aperiodic TRSs. The UE may then update one or more time tracking parameters, frequency tracking parameters, or combinations thereof based on the same large scale transmission parameters being used for the multiple instances of the aperiodic TRSs. While FIGS. 3 through 6 show a number of examples of different DCIs that may trigger aperiodic TRSs, it is to be understood that these examples are provided for purposes of discussion and illustration of the techniques disclosed herein, and other examples are also within the scope of the disclosure. Further, while various examples show two instances of aperiodic TRS transmissions, techniques discussed herein may be applied to any number of instances of aperiodic reference signal transmissions.

Figure 7:
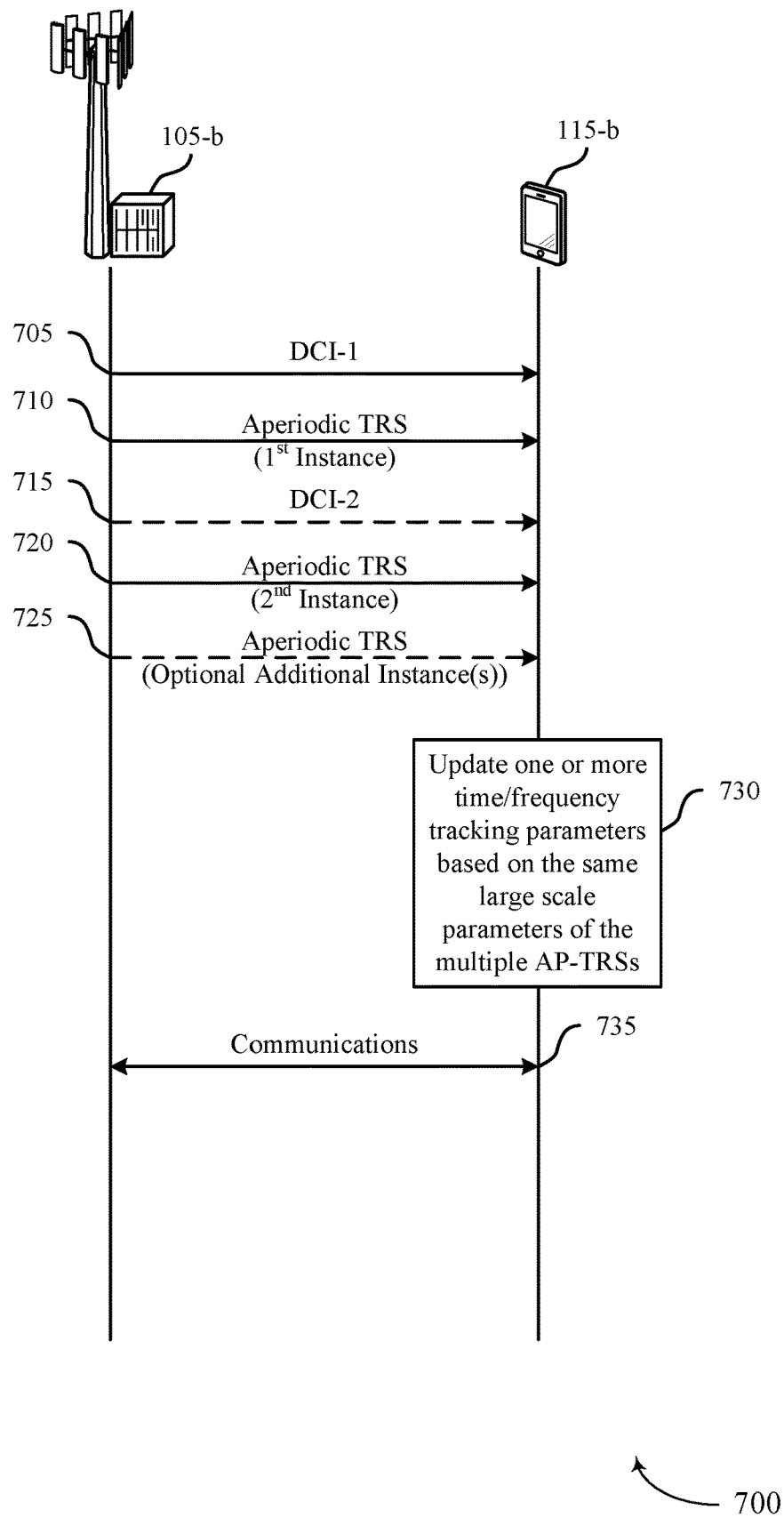
FIG. 7 illustrates an example of a process flow that supports implicit signaling of large-scale channel properties across multiple tracking reference signal transmissions in accordance with aspects of the present disclosure.

FIG. 7 illustrates an example of a process flow 700 that supports implicit signaling of large-scale channel properties across multiple tracking reference signal transmissions in accordance with aspects of the present disclosure. In some examples, process flow 700 may be implemented in aspects of wireless communications system 100 or 200. The process flow 700 may include base station 105-*b* and UE 115-*b*, which may be examples of the corresponding devices described with respect to FIGS. 1 and 2.

In this example, at 705, base station 105-*b* may transmit a first DCI that triggers an aperiodic TRS (e.g., an aperiodic CSI-RS) transmission to UE 115-*b*. Base station 105-*b* may determine to schedule an aperiodic TRS transmission based on a change in channel quality, movement of base station 105-*b* or UE 115-*b*, a prior measurement report of the UE 115-*b*, a number of unsuccessful transmissions using a current beam configuration, a most recent aperiodic TRS transmission, a load on the channel, etc. UE 115-*b* may monitor for the aperiodic TRS according to the scheduling information contained in the DCI.

At 710, base station 105-*b* may transmit a first instance of the aperiodic TRS to UE 115-*b*. In some cases, base station 105-*b* may transmit the aperiodic TRS during a transmission opportunity (TxOP) indicated by the first DCI.

Optionally, at 715, the base station 105-*b* may transmit a second DCI that triggers a second instance of an aperiodic TRS (e.g., another instance of the prior TRS or an instance of a different TRS). In some cases, the second DCI may be transmitted prior to the first instance of the aperiodic TRS (e.g., in a same PDCCH monitoring occasion, or in different PDCCH monitoring occasions that are consecutive or non-consecutive). The second DCI in such examples indicates a same TCI state as the first DCI.

At 720, base station 105-*b* may transmit a second instance of the aperiodic TRS to UE 115-*b*. In some cases, base station 105-*b* may transmit the aperiodic TRS during a transmission opportunity (TxOP) indicated by the first DCI of by the second DCI. In some cases, the second instance of the aperiodic TRS may be another instance of the same TRS that was transmitted previously, or may be an instance of a different TRS. At 725, the base station 105-*b* may optionally transmit one or more additional instances of the one or more aperiodic TRSs that may be monitored and measured at the UE 115-*b*.

At 730, the UE 115-*b* may update one or more time/frequency tracking parameters based on the same large scale parameters of the multiple aperiodic TRSs. For example, the UE 115-*b* may update one or more of a frequency tracking loop, a time tracking loop, or any combinations thereof based on the same large-scale channel parameters of the multiple instances of the aperiodic TRSs.

At 735, UE 115-*b* and base station 105-*b* may exchange wireless communications based on any time/frequency tracking parameters that were updated at the UE 115-*b*.

Figure 8:
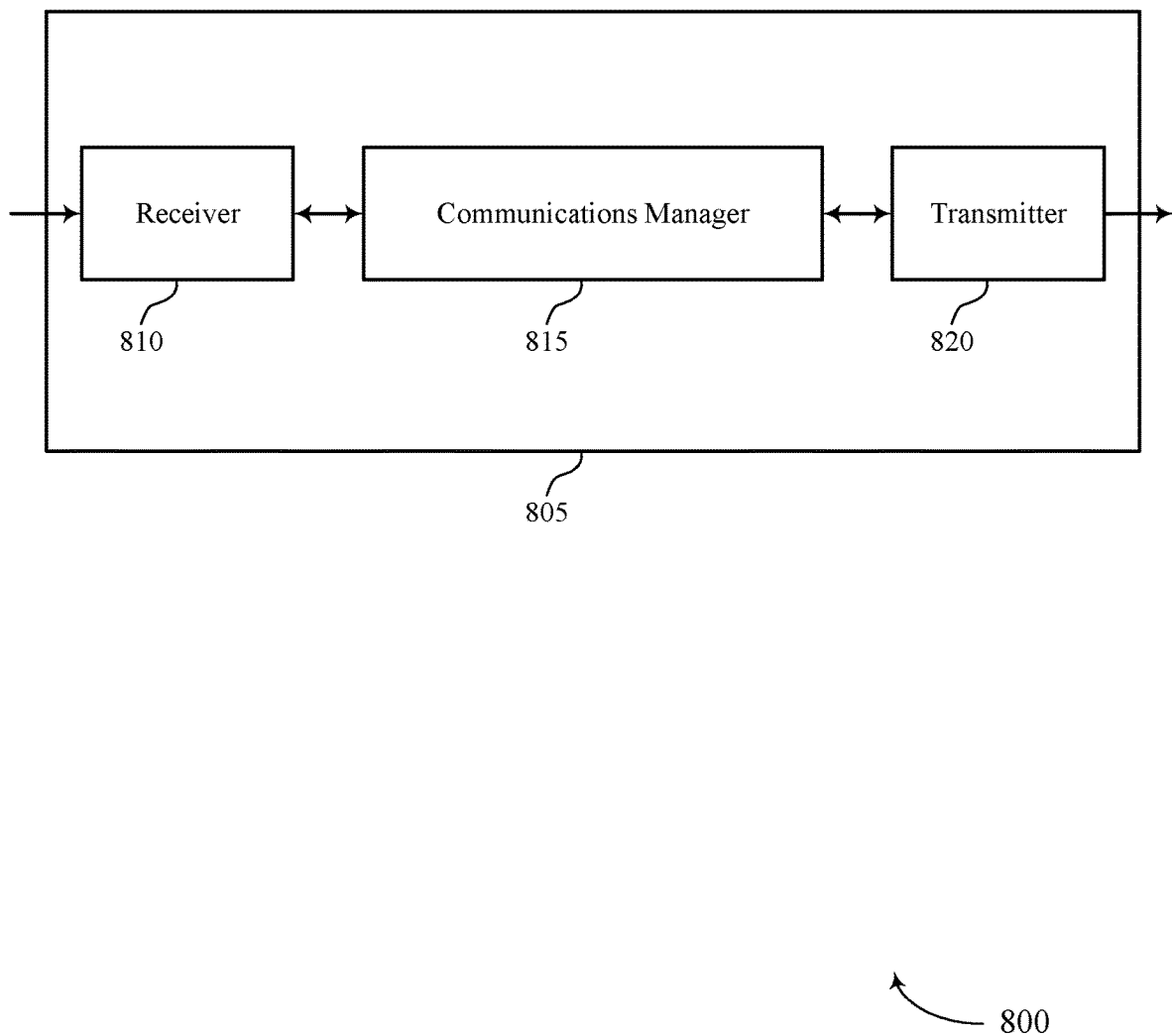
FIGS. 8 and 9 show block diagrams of devices that support implicit signaling of large-scale channel properties across multiple tracking reference signal transmissions in accordance with aspects of the present disclosure.

FIG. 8 shows a block diagram 800 of a device 805 that supports implicit signaling of large-scale channel properties across multiple tracking reference signal transmissions in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to implicit signaling of large-scale channel properties across multiple tracking reference signal transmissions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, downlink control information that includes a first transmission configuration indicator state for at least a first slot, and that includes a trigger for an aperiodic tracking reference signal in at least the first slot, measure a first instance of the aperiodic tracking reference signal in the first slot and a second instance of the aperiodic tracking reference signal in the first slot or a second slot, and update one or more time tracking parameters, frequency tracking parameters, or combinations thereof based on a same first set of large scale transmission parameters being used for at least the first instance of the aperiodic tracking reference signal and the second instance of the aperiodic tracking reference signal. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
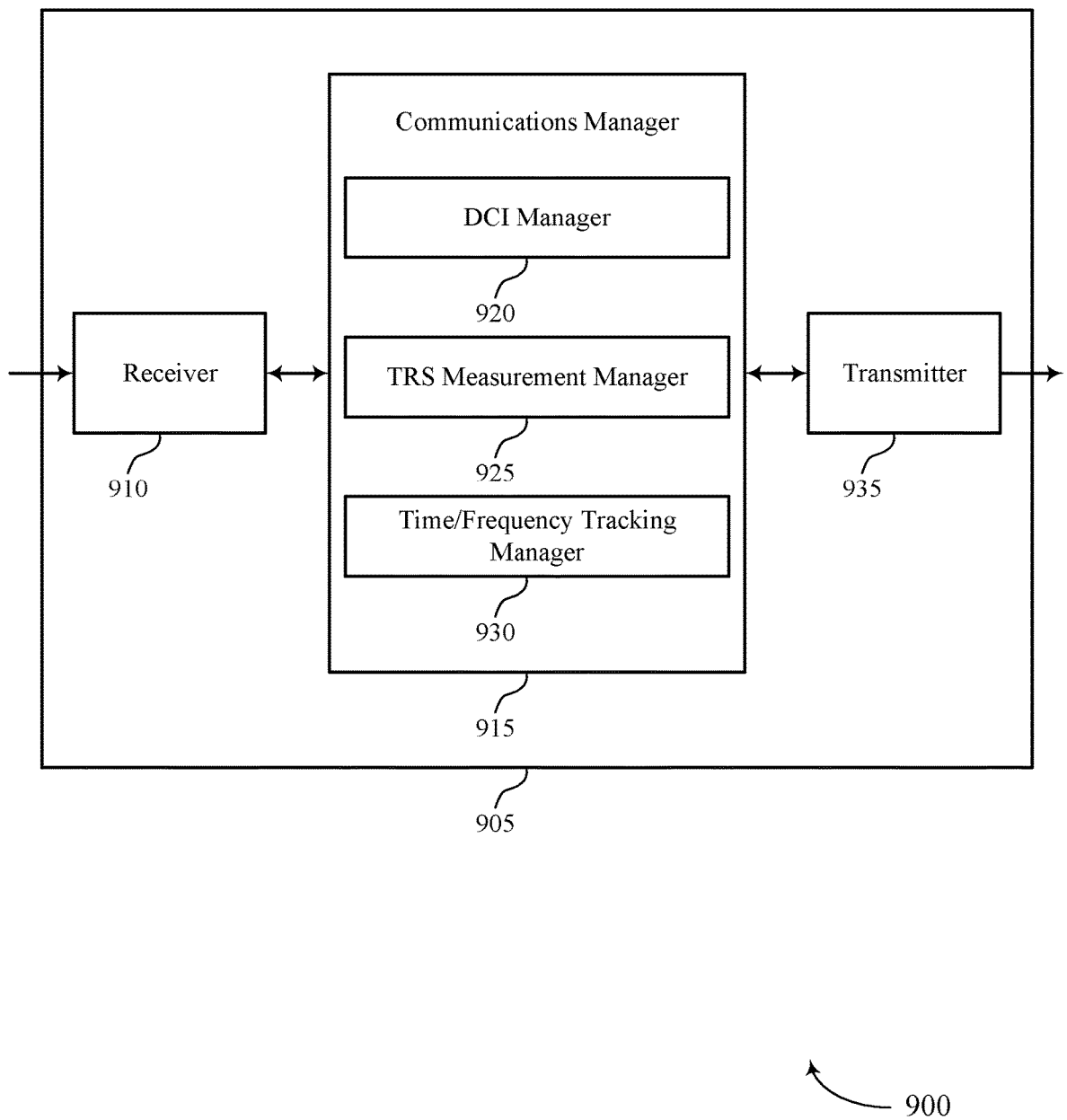

FIG. 9 shows a block diagram 900 of a device 905 that supports implicit signaling of large-scale channel properties across multiple tracking reference signal transmissions in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to implicit signaling of large-scale channel properties across multiple tracking reference signal transmissions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a DCI manager 920, a TRS measurement manager 925, and a time/frequency tracking manager 930. The communications manager 915 may be an example of aspects of the communications manager 1110 described herein.

The DCI manager 920 may receive, from a base station, downlink control information that includes a first transmission configuration indicator state for at least a first slot, and that includes a trigger for an aperiodic tracking reference signal in at least the first slot.

The TRS measurement manager 925 may measure a first instance of the aperiodic tracking reference signal in the first slot and a second instance of the aperiodic tracking reference signal in the first slot or a second slot.

The time/frequency tracking manager 930 may update one or more time tracking parameters, frequency tracking parameters, or combinations thereof based on a same first set of large scale transmission parameters being used for at least the first instance of the aperiodic tracking reference signal and the second instance of the aperiodic tracking reference signal.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
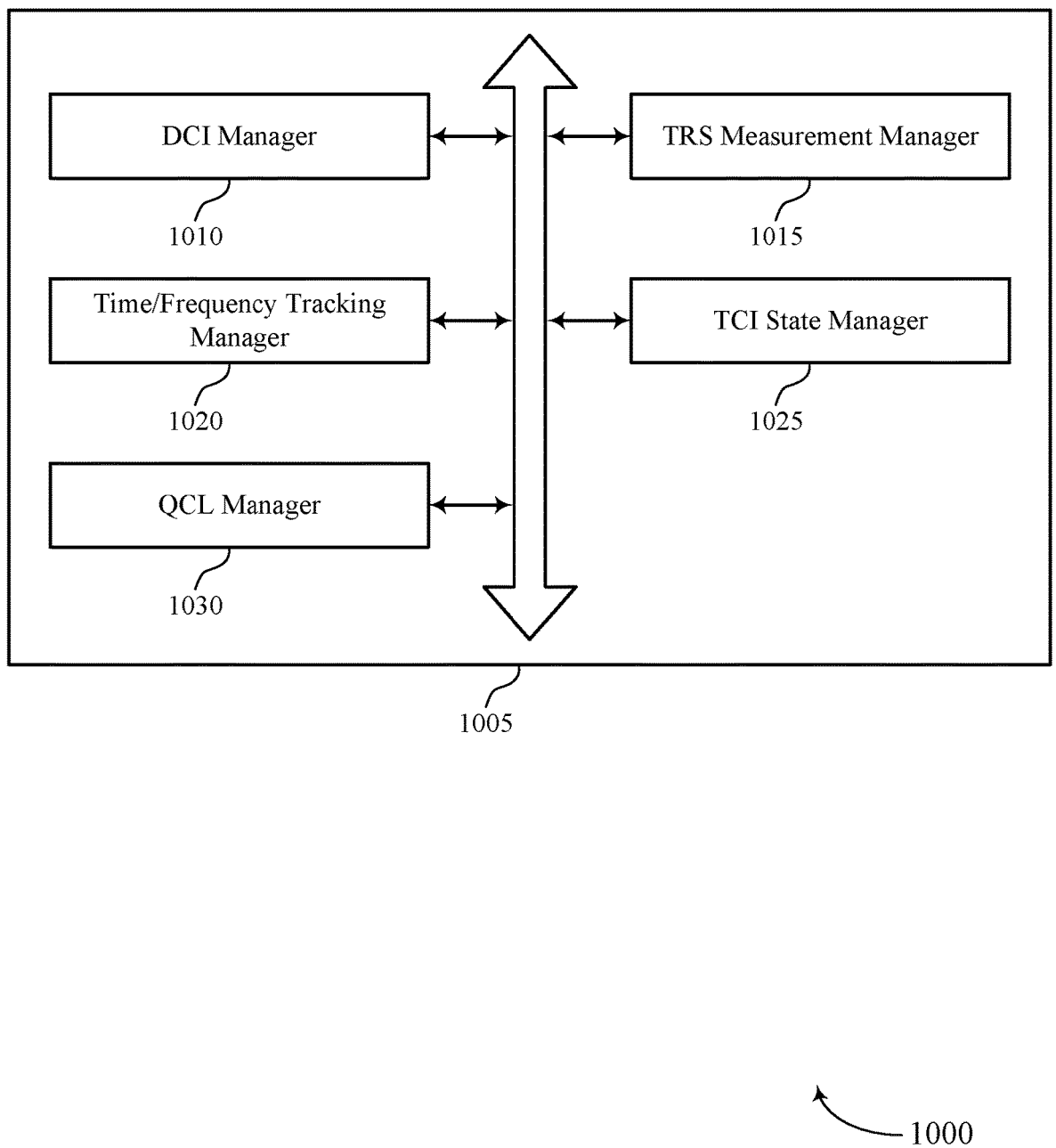
FIG. 10 shows a block diagram of a communications manager that supports implicit signaling of large-scale channel properties across multiple tracking reference signal transmissions in accordance with aspects of the present disclosure.

FIG. 10 shows a block diagram 1000 of a communications manager 1005 that supports implicit signaling of large-scale channel properties across multiple tracking reference signal transmissions in accordance with aspects of the present disclosure. The communications manager 1005 may be an example of aspects of a communications manager 815, a communications manager 915, or a communications manager 1110 described herein. The communications manager 1005 may include a DCI manager 1010, a TRS measurement manager 1015, a feedback report manager 1020, a TCI state manager 1025, and a QCL manager 1030. Each of these modules may communicate, directly or indirectly, with one another (e.g., via one or more buses).

The DCI manager 1010 may receive, from a base station, downlink control information that includes a first transmission configuration indicator state for at least a first slot, and that includes a trigger for an aperiodic tracking reference signal in at least the first slot. In some cases, the downlink control information is received in a first downlink control information transmission in a first downlink control channel monitoring occasion of the first slot that triggers the first instance of the aperiodic tracking reference signal and in a second downlink control information transmission in a second downlink control channel monitoring occasion of the second slot that triggers the second instance of the aperiodic tracking reference signal within the second slot. In some cases, the aperiodic tracking reference signal is a first aperiodic tracking reference signal, and where the downlink control information further triggers one or more additional instances of the first aperiodic tracking reference signal or one or more other aperiodic tracking reference signals.

In some cases, the downlink control information is received in a first downlink control information transmission in a downlink control channel monitoring occasion of the first slot that triggers the first instance of the aperiodic tracking reference signal and the second instance of the aperiodic tracking reference signal within the second slot. In some cases, the downlink control information is received in both a first downlink control information transmission and a second downlink control information transmission that are transmitted in one or more of a first downlink control channel monitoring occasion or a second downlink control channel monitoring occasion. In some cases, the first downlink control information transmission and the second downlink control information transmission are both received in the first downlink control channel monitoring occasion.

In some cases, the first downlink control information transmission is received in the first downlink control channel monitoring occasion and the second downlink control information transmission is received in the second downlink control channel monitoring occasion that is consecutive to the first downlink control channel monitoring occasion. In some cases, the first downlink control information transmission is received in the first downlink control channel monitoring occasion and the second downlink control information transmission is received in the second downlink control channel monitoring occasion that is non-consecutive to the first downlink control channel monitoring occasion, and where both the first downlink control channel monitoring occasion and the second downlink control channel monitoring occasion are in the first slot.

The TRS measurement manager 1015 may measure a first instance of the aperiodic tracking reference signal in the first slot and a second instance of the aperiodic tracking reference signal in the first slot or a second slot.

The time/frequency tracking manager 1020 may update one or more time tracking parameters, frequency tracking parameters, or combinations thereof based on a same first set of large scale transmission parameters being used for at least the first instance of the aperiodic tracking reference signal and the second instance of the aperiodic tracking reference signal.

The TCI state manager 1025 may manage TCI states, which may include TCI states associated with aperiodic TRSs and with periodic TRSs. In some cases, a second transmission configuration indicator state may indicate a second set of large scale transmission parameters for the periodic tracking reference signal, which may be semi-statically indicated by the base station, and where the second set of large scale transmission parameters is different than the first set of large scale transmission parameters. In some cases, the first transmission configuration indicator state indicates the first set of large scale transmission parameters. In some cases, the first downlink control information transmission and the second downlink control information transmission both indicate the first transmission configuration indicator state, and where the UE assumes the first set of large scale transmission parameters are used for both the first instance of the aperiodic tracking reference signal and the second instance of the aperiodic tracking reference signal when measuring the aperiodic tracking reference signal.

The QCL manager 1030 may identify QCL parameters for downlink transmissions. In some cases, the first set of large scale transmission parameters include QCL parameters that are used for the first instance of the aperiodic tracking reference signal and the second instance of the aperiodic tracking reference signal.

Figure 11:
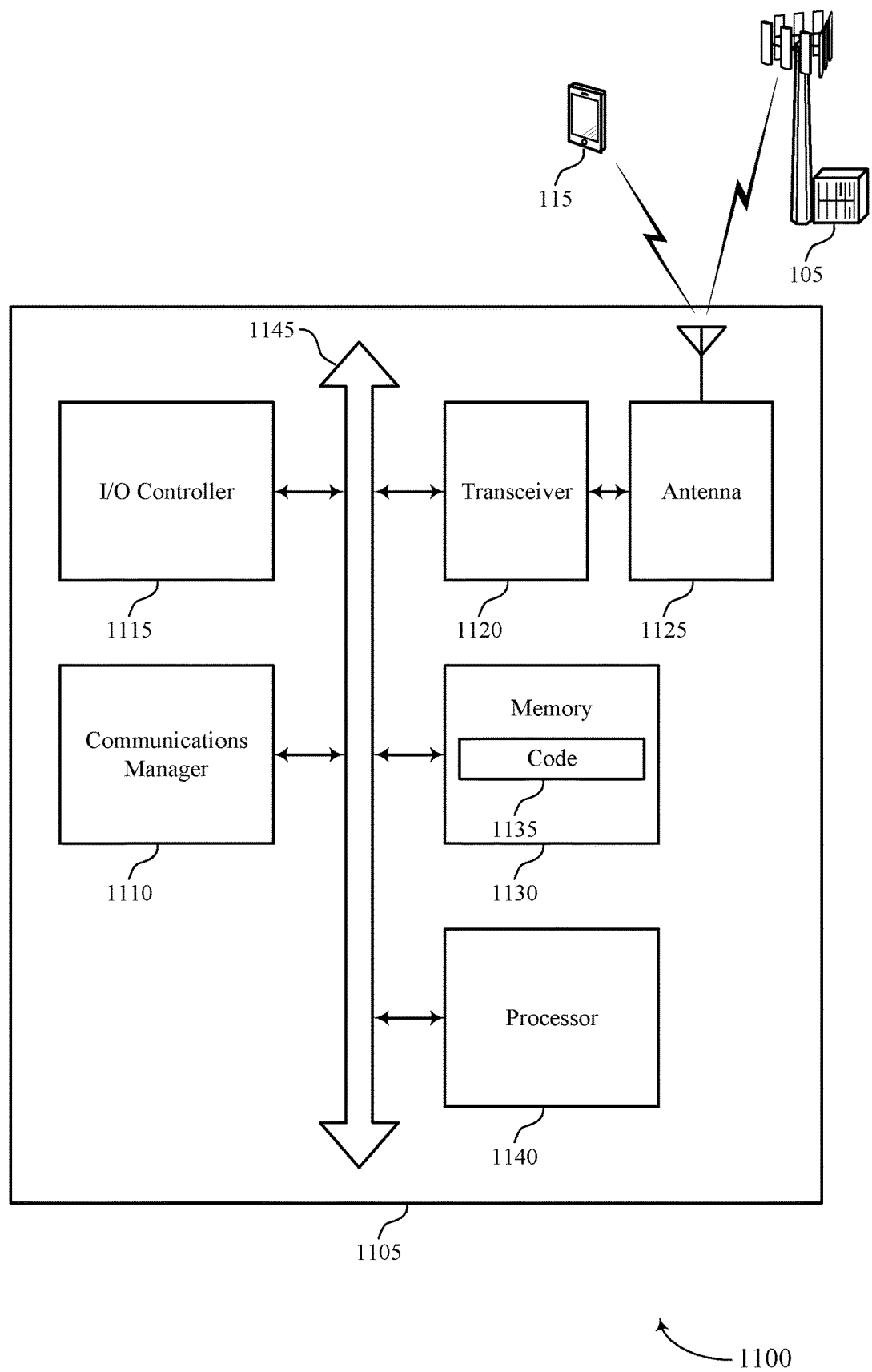
FIG. 11 shows a diagram of a system including a device that supports implicit signaling of large-scale channel properties across multiple tracking reference signal transmissions in accordance with aspects of the present disclosure.

FIG. 11 shows a diagram of a system 1100 including a device 1105 that supports implicit signaling of large-scale channel properties across multiple tracking reference signal transmissions in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, downlink control information that includes a first transmission configuration indicator state for at least a first slot, and that includes a trigger for an aperiodic tracking reference signal in at least the first slot, measure a first instance of the aperiodic tracking reference signal in the first slot and a second instance of the aperiodic tracking reference signal in the first slot or a second slot, and update one or more time tracking parameters, frequency tracking parameters, or combinations thereof based on a same first set of large scale transmission parameters being used for at least the first instance of the aperiodic tracking reference signal and the second instance of the aperiodic tracking reference signal.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting implicit signaling of large-scale channel properties across multiple tracking reference signal transmissions).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
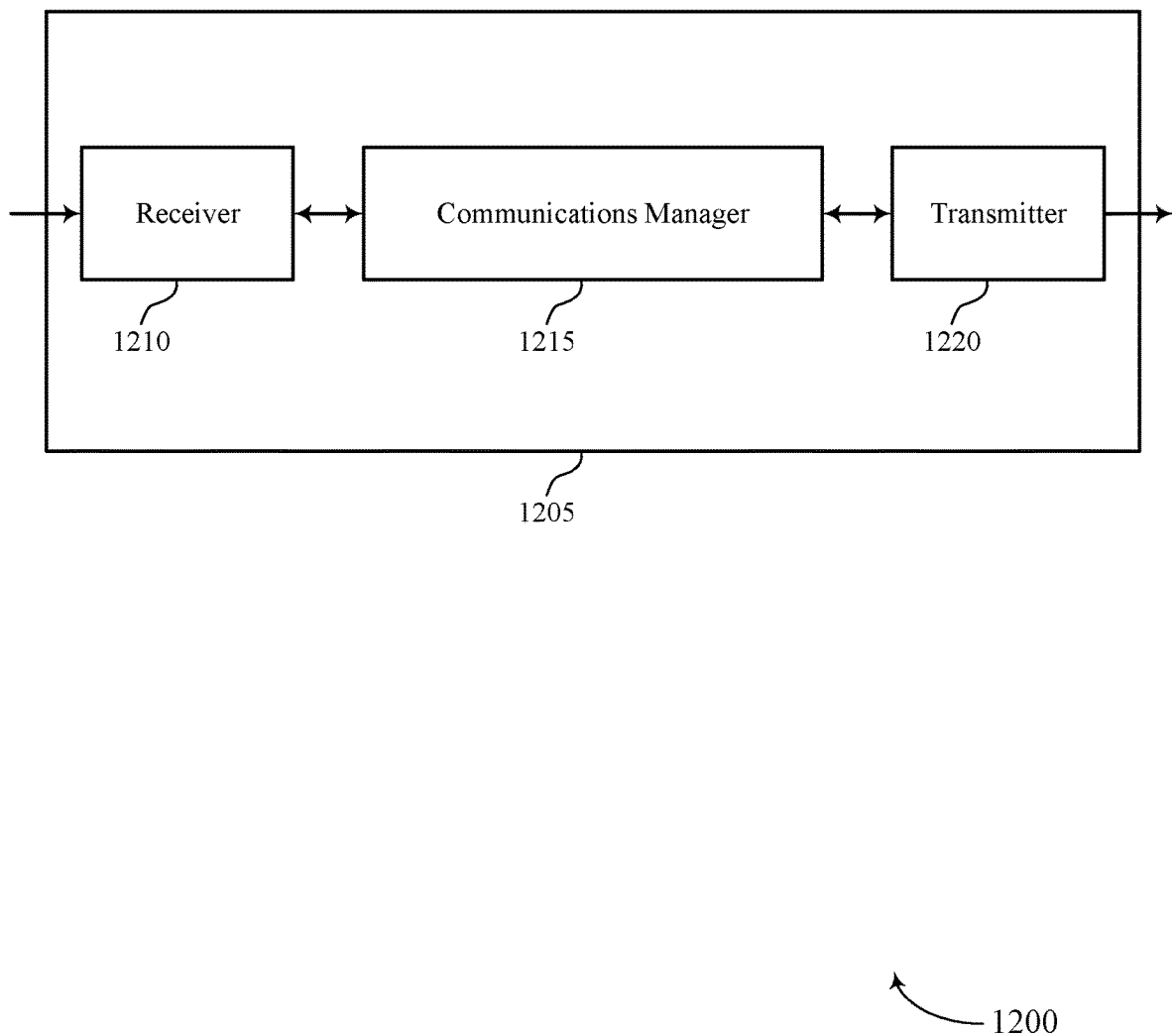
FIGS. 12 and 13 show block diagrams of devices that support implicit signaling of large-scale channel properties across multiple tracking reference signal transmissions in accordance with aspects of the present disclosure.

FIG. 12 shows a block diagram 1200 of a device 1205 that supports implicit signaling of large-scale channel properties across multiple tracking reference signal transmissions in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to implicit signaling of large-scale channel properties across multiple tracking reference signal transmissions, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, downlink control information that includes a first transmission configuration indicator state for at least a first slot, and that includes a trigger for an aperiodic tracking reference signal in at least the first slot and a second slot, transmit a first instance of the aperiodic tracking reference signal in the first slot and a second instance of the aperiodic tracking reference signal in the second slot, where a same first set of large scale transmission parameters is used for both the first instance of the aperiodic tracking reference signal and the second instance of the aperiodic tracking reference signal, and receive a feedback report that includes one or more parameters that are determined based on the first instance of the aperiodic tracking reference signal and the second instance of the aperiodic tracking reference signal. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
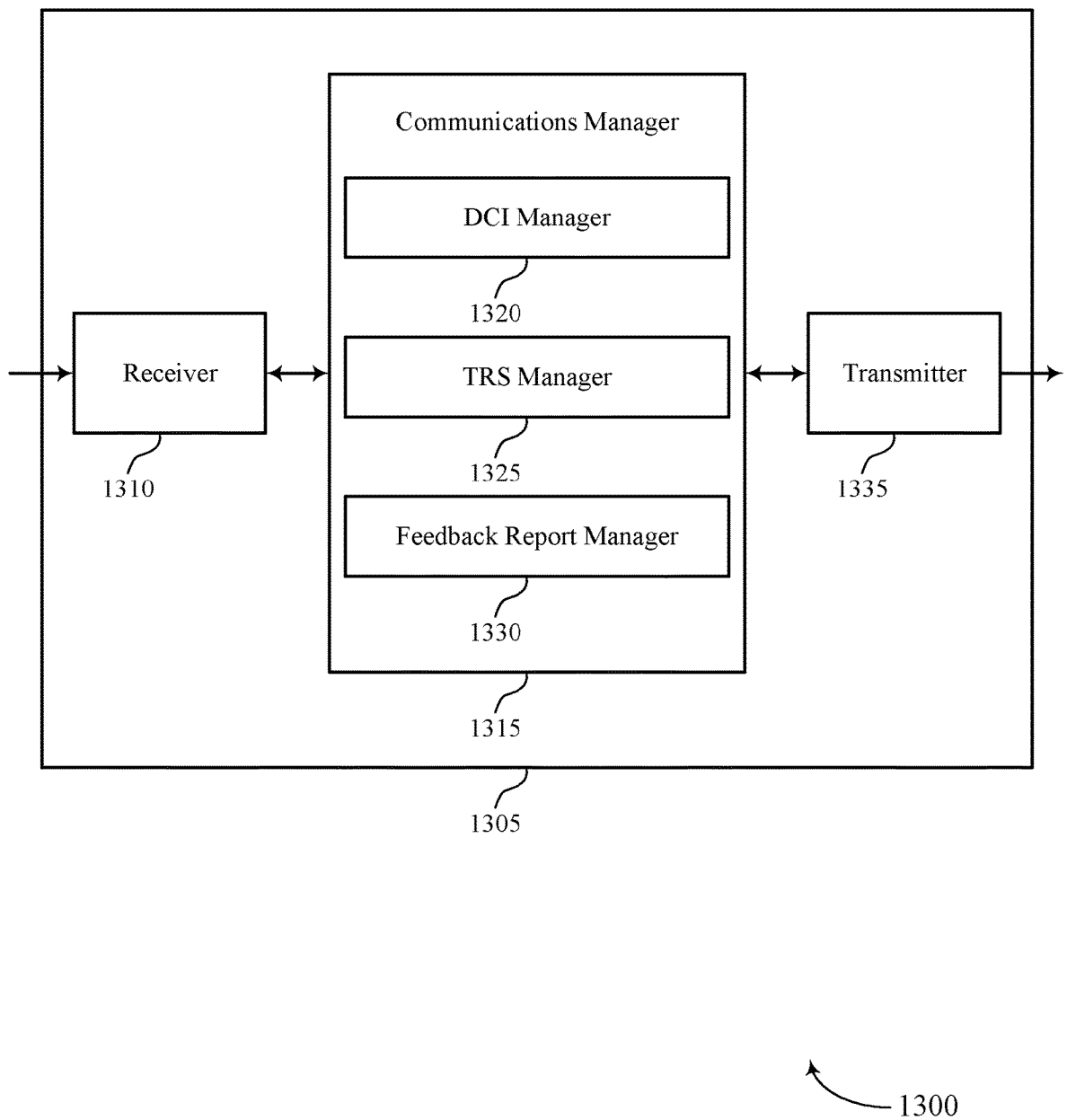

FIG. 13 shows a block diagram 1300 of a device 1305 that supports implicit signaling of large-scale channel properties across multiple tracking reference signal transmissions in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to implicit signaling of large-scale channel properties across multiple tracking reference signal transmissions, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a DCI manager 1320, a TRS manager 1325, and a feedback report manager 1330. The communications manager 1315 may be an example of aspects of the communications manager 1510 described herein.

The DCI manager 1320 may transmit, to a UE, downlink control information that includes a first transmission configuration indicator state for at least a first slot, and that includes a trigger for an aperiodic tracking reference signal in at least the first slot and a second slot.

The TRS manager 1325 may transmit a first instance of the aperiodic tracking reference signal in the first slot and a second instance of the aperiodic tracking reference signal in the second slot, where a same first set of large scale transmission parameters is used for both the first instance of the aperiodic tracking reference signal and the second instance of the aperiodic tracking reference signal.

The feedback report manager 1330 may receive a feedback report that includes one or more parameters that are determined based on the first instance of the aperiodic tracking reference signal and the second instance of the aperiodic tracking reference signal.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
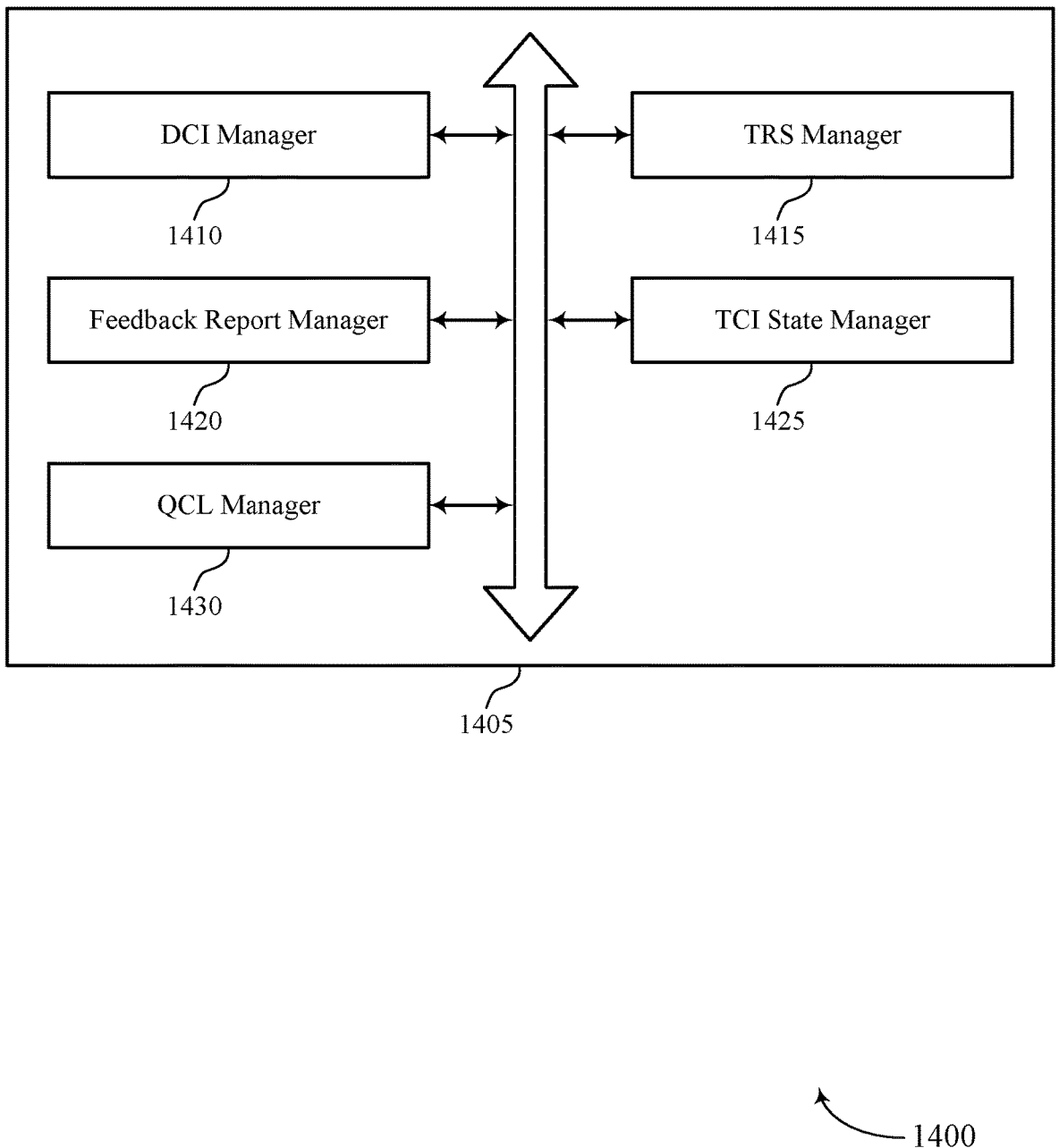
FIG. 14 shows a block diagram of a communications manager that supports implicit signaling of large-scale channel properties across multiple tracking reference signal transmissions in accordance with aspects of the present disclosure.

FIG. 14 shows a block diagram 1400 of a communications manager 1405 that supports implicit signaling of large-scale channel properties across multiple tracking reference signal transmissions in accordance with aspects of the present disclosure. The communications manager 1405 may be an example of aspects of a communications manager 1215, a communications manager 1315, or a communications manager 1510 described herein. The communications manager 1405 may include a DCI manager 1410, a TRS manager 1415, a feedback report manager 1420, a TCI state manager 1425, and a QCL manager 1430. Each of these modules may communicate, directly or indirectly, with one another (e.g., via one or more buses).

The DCI manager 1410 may transmit, to a UE, downlink control information that includes a first transmission configuration indicator state for at least a first slot, and that includes a trigger for an aperiodic tracking reference signal in at least the first slot and a second slot. In some cases, the downlink control information is transmitted in a first downlink control information transmission in a first downlink control channel monitoring occasion of the first slot that triggers the first instance of the aperiodic tracking reference signal and the second instance of the aperiodic tracking reference signal.

In some cases, the first downlink control information transmission and the second downlink control information transmission both indicate the first transmission configuration indicator state, and where the UE assumes the first set of large scale transmission parameters are used for both the first aperiodic tracking reference signal and the second aperiodic tracking reference signal when measuring the first aperiodic tracking reference signal and the second aperiodic tracking reference signal.

In some cases, the downlink control information is transmitted in a first downlink control information transmission in a downlink control channel monitoring occasion of the first slot that triggers the first instance of the aperiodic tracking reference signal and the second instance of the aperiodic tracking reference signal within the second slot. In some cases, the downlink control information is transmitted in both a first downlink control information transmission and a second downlink control information transmission that are provided in one or more downlink control channel monitoring occasions of one or more slots. In some cases, the first downlink control information transmission and the second downlink control information transmission are both provided in the first downlink control channel monitoring occasion.

In some cases, the first downlink control information transmission is provided in a first downlink control channel monitoring occasion and the second downlink control information transmission is provided in a second downlink control channel monitoring occasion that is consecutive to the first downlink control channel monitoring occasion. In some cases, the first downlink control information transmission is provided in a first downlink control channel monitoring occasion and the second downlink control information transmission is provided in a second downlink control channel monitoring occasion that is non-consecutive to the first downlink control channel monitoring occasion, and where both the first downlink control channel monitoring occasion and the second downlink control channel monitoring occasion are in the first slot.

The TRS manager 1415 may transmit a first instance of the aperiodic tracking reference signal in the first slot and a second instance of the aperiodic tracking reference signal in the second slot, where a same first set of large scale transmission parameters is used for both the first instance of the aperiodic tracking reference signal and the second instance of the aperiodic tracking reference signal. In some cases, the aperiodic tracking reference signal is a first aperiodic tracking reference signal, and where the downlink control information is further transmitted in a second downlink control information transmission in a second downlink control channel monitoring occasion of the second slot that triggers one or more instances of a second aperiodic tracking reference signal in one or other slots.

The feedback report manager 1420 may receive a feedback report that includes one or more parameters that are determined based on the first instance of the aperiodic tracking reference signal and the second instance of the aperiodic tracking reference signal.

The TCI state manager 1425 may determine a TCI state for transmission of downlink data transmissions and reference signals. In some cases, a configuration for a periodic tracking reference signal may provide a second set of large scale transmission parameters for the periodic tracking reference signal and be semi-statically indicated to the UE, and where the second set of large scale transmission parameters is different than the first set of large scale transmission parameters. In some cases, the first transmission configuration indicator state indicates the first set of large scale transmission parameters. In some cases, the second transmission configuration indicator state is semi-statically indicated in one or more periodic synchronization signal blocks.

The QCL manager 1430 may identify QCL parameters for use in communications with UEs. In some cases, the first set of large scale transmission parameters include QCL parameters that are used for the first instance of the aperiodic tracking reference signal and the second instance of the aperiodic tracking reference signal.

Figure 15:
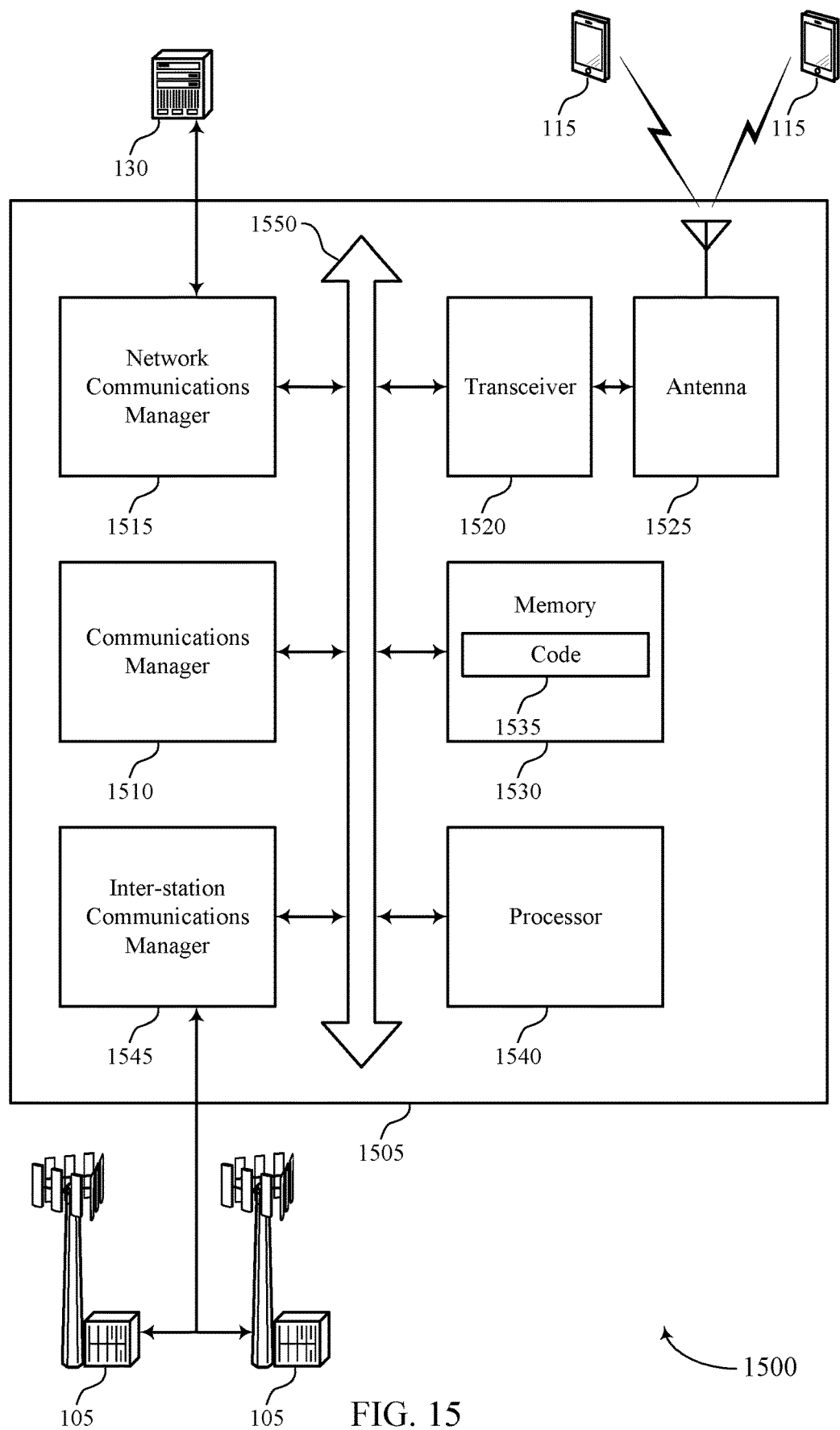
FIG. 15 shows a diagram of a system including a device that supports implicit signaling of large-scale channel properties across multiple tracking reference signal transmissions in accordance with aspects of the present disclosure.

FIG. 15 shows a diagram of a system 1500 including a device 1505 that supports implicit signaling of large-scale channel properties across multiple tracking reference signal transmissions in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, downlink control information that includes a first transmission configuration indicator state for at least a first slot, and that includes a trigger for an aperiodic tracking reference signal in at least the first slot and a second slot, transmit a first instance of the aperiodic tracking reference signal in the first slot and a second instance of the aperiodic tracking reference signal in the second slot, where a same first set of large scale transmission parameters is used for both the first instance of the aperiodic tracking reference signal and the second instance of the aperiodic tracking reference signal, and receive a feedback report that includes one or more parameters that are determined based on the first instance of the aperiodic tracking reference signal and the second instance of the aperiodic tracking reference signal.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting implicit signaling of large-scale channel properties across multiple tracking reference signal transmissions).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
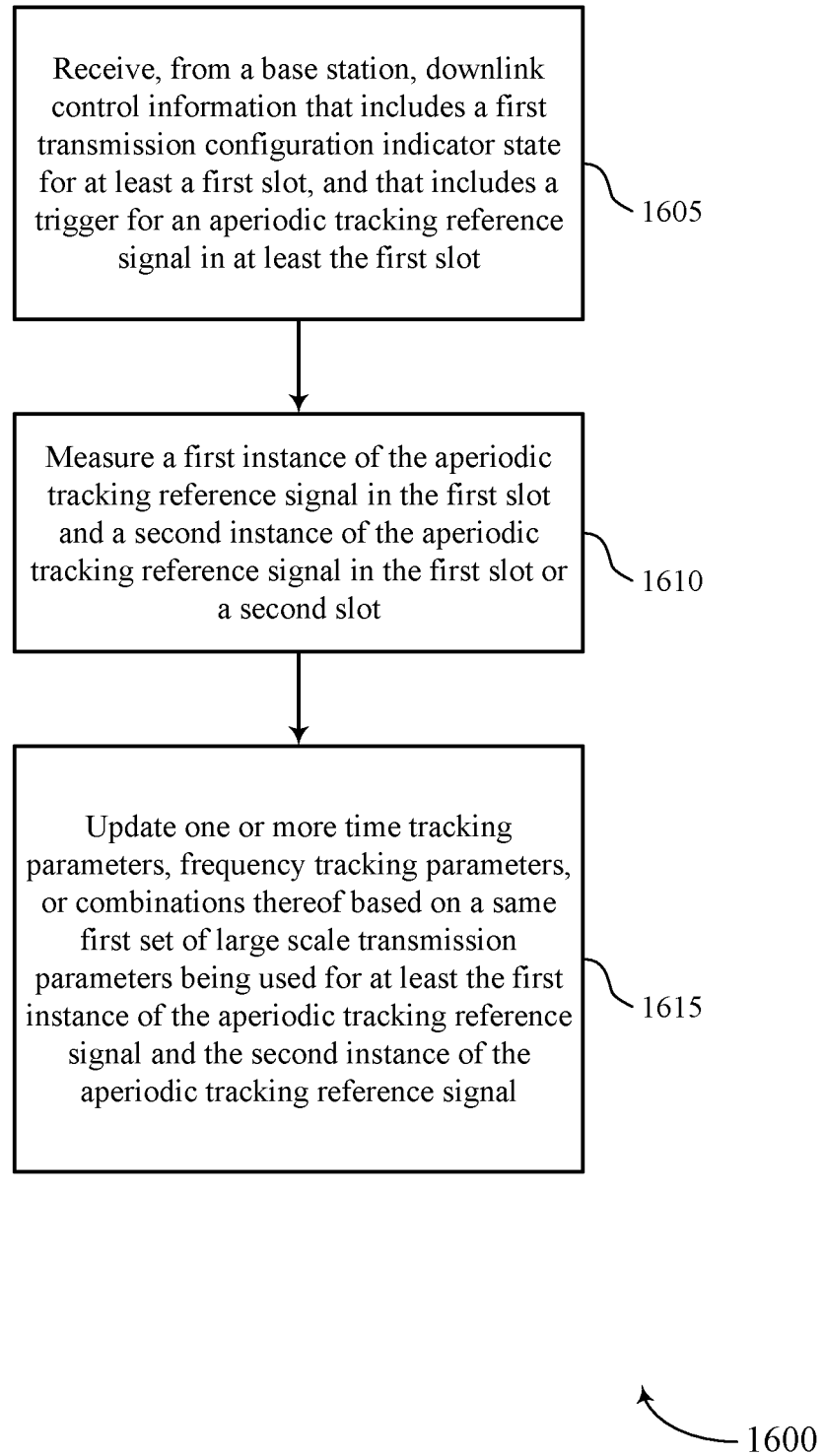
FIGS. 16 and 17 show flowcharts illustrating methods that support implicit signaling of large-scale channel properties across multiple tracking reference signal transmissions in accordance with aspects of the present disclosure.

FIG. 16 shows a flowchart illustrating a method 1600 that supports implicit signaling of large-scale channel properties across multiple tracking reference signal transmissions in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, downlink control information that includes a first transmission configuration indicator state for at least a first slot, and that includes a trigger for an aperiodic tracking reference signal in at least the first slot. The operations of 1605 may be performed according to the methods described herein. In some examples, aspects of the operations of 1605 may be performed by a DCI manager as described with reference to FIGS. 8 through 11.

At 1610, the UE may measure a first instance of the aperiodic tracking reference signal in the first slot and a second instance of the aperiodic tracking reference signal in the first slot or a second slot. The operations of 1610 may be performed according to the methods described herein. In some examples, aspects of the operations of 1610 may be performed by a TRS measurement manager as described with reference to FIGS. 8 through 11.

At 1615, the UE may update one or more time tracking parameters, frequency tracking parameters, or combinations thereof based on a same first set of large scale transmission parameters being used for at least the first instance of the aperiodic tracking reference signal and the second instance of the aperiodic tracking reference signal. The operations of 1615 may be performed according to the methods described herein. In some examples, aspects of the operations of 1615 may be performed by a time/frequency tracking manager as described with reference to FIGS. 8 through 11.

Figure 17:
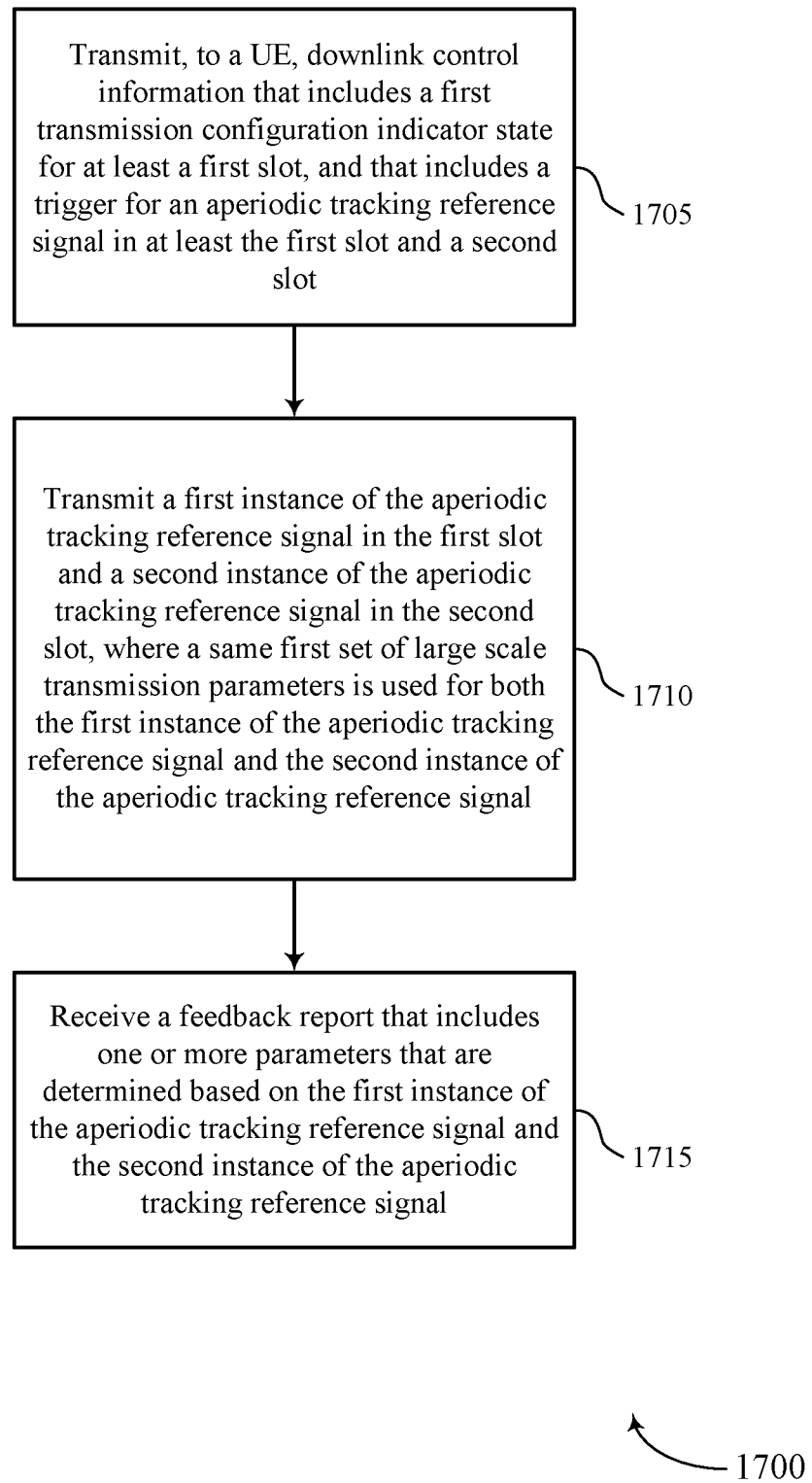

FIG. 17 shows a flowchart illustrating a method 1700 that supports implicit signaling of large-scale channel properties across multiple tracking reference signal transmissions in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, downlink control information that includes a first transmission configuration indicator state for at least a first slot, and that includes a trigger for an aperiodic tracking reference signal in at least the first slot and a second slot. The operations of 1705 may be performed according to the methods described herein. In some examples, aspects of the operations of 1705 may be performed by a DCI manager as described with reference to FIGS. 12 through 15.

At 1710, the base station may transmit a first instance of the aperiodic tracking reference signal in the first slot and a second instance of the aperiodic tracking reference signal in the second slot, where a same first set of large scale transmission parameters is used for both the first instance of the aperiodic tracking reference signal and the second instance of the aperiodic tracking reference signal. The operations of 1710 may be performed according to the methods described herein. In some examples, aspects of the operations of 1710 may be performed by a TRS manager as described with reference to FIGS. 12 through 15.

At 1715, the base station may receive a feedback report that includes one or more parameters that are determined based on the first instance of the aperiodic tracking reference signal and the second instance of the aperiodic tracking reference signal. The operations of 1715 may be performed according to the methods described herein. In some examples, aspects of the operations of 1715 may be performed by a feedback report manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving downlink control information that includes a first transmission configuration indicator state for at least a first slot, and that includes a trigger for an aperiodic tracking reference signal in at least the first slot;

measuring a first instance of the aperiodic tracking reference signal in the first slot and a second instance of the aperiodic tracking reference signal in the first slot or a second slot; and updating one or more time tracking parameters, frequency tracking parameters, or combinations thereof based at least in part on a same first set of large scale transmission parameters being used for at least the first instance of the aperiodic tracking reference signal and the second instance of the aperiodic tracking reference signal, wherein the first set of large scale transmission parameters are different than a second set of large scale transmission parameters that are used for a periodic tracking reference signal.

2. The method of claim 1, wherein the first transmission configuration indicator state indicates the first set of large scale transmission parameters.

3. The method of claim 2, wherein the second set of large scale transmission parameters are semi-statically indicated by a second transmission configuration indicator state for the periodic tracking reference signal, and wherein the second transmission configuration indicator state is semi-statically indicated in one or more periodic synchronization signal blocks.

4. The method of claim 1, wherein the first set of large scale transmission parameters include quasi co-location (QCL) parameters that are used for the first instance of the aperiodic tracking reference signal and the second instance of the aperiodic tracking reference signal.

5. The method of claim 1, wherein the downlink control information is received in a first downlink control information transmission in a first downlink control channel monitoring occasion of the first slot that triggers the first instance of the aperiodic tracking reference signal and in a second downlink control information transmission in a second downlink control channel monitoring occasion of the second slot that triggers the second instance of the aperiodic tracking reference signal within the second slot.

6. The method of claim 5, wherein the aperiodic tracking reference signal is a first aperiodic tracking reference signal, and wherein the downlink control information further triggers one or more additional instances of the first aperiodic tracking reference signal or one or more other aperiodic tracking reference signals.

7. The method of claim 5, wherein the first downlink control information transmission and the second downlink control information transmission both indicate the first transmission configuration indicator state, and wherein the UE assumes the first set of large scale transmission parameters are used for both the first instance of the aperiodic tracking reference signal and the second instance of the aperiodic tracking reference signal when measuring the aperiodic tracking reference signal.

8. The method of claim 1, wherein the downlink control information is received in a first downlink control information transmission in a downlink control channel monitoring occasion of the first slot that triggers the first instance of the aperiodic tracking reference signal and the second instance of the aperiodic tracking reference signal within the second slot.

9. The method of claim 1, wherein the downlink control information is received in both a first downlink control information transmission and a second downlink control information transmission that are transmitted in one or more of a first downlink control channel monitoring occasion or a second downlink control channel monitoring occasion.

10. The method of claim 9, wherein:
the first downlink control information transmission and the second downlink control information transmission are both received in the first downlink control channel monitoring occasion,
the first downlink control information transmission is received in the first downlink control channel monitoring occasion and the second downlink control information transmission is received in the second downlink control channel monitoring occasion that is consecutive to the first downlink control channel monitoring occasion, or the first downlink control information transmission is received in the first downlink control channel monitoring occasion and the second downlink control information transmission is received in the second downlink control channel monitoring occasion that is non-consecutive to the first downlink control channel monitoring occasion, and wherein both the first downlink control channel monitoring occasion and the second downlink control channel monitoring occasion are in the first slot.

11. A method for wireless communication at an access network entity, comprising:
transmitting, to a user equipment (UE), downlink control information that includes a first transmission configuration indicator state for at least a first slot, and that includes a trigger for an aperiodic tracking reference signal in at least the first slot and a second slot;
transmitting a first instance of the aperiodic tracking reference signal in the first slot and a second instance of the aperiodic tracking reference signal in the second slot, wherein a same first set of large scale transmission parameters is used for both the first instance of the aperiodic tracking reference signal and the second instance of the aperiodic tracking reference signal, and wherein the first set of large scale transmission parameters are different than a second set of large scale transmission parameters that are used for a periodic tracking reference signal; and
receiving a feedback report that includes one or more parameters that are determined based at least in part on the first instance of the aperiodic tracking reference signal and the second instance of the aperiodic tracking reference signal.

12. The method of claim 11, wherein the first transmission configuration indicator state indicates the first set of large scale transmission parameters.

13. The method of claim 12, wherein the second set of large scale transmission parameters are semi-statically indicated by a second transmission configuration indicator state for the periodic tracking reference signal, and wherein the second transmission configuration indicator state is semi-statically indicated in one or more periodic synchronization signal blocks.

14. The method of claim 11, wherein the first set of large scale transmission parameters include quasi co-location (QCL) parameters that are used for the first instance of the aperiodic tracking reference signal and the second instance of the aperiodic tracking reference signal.

15. The method of claim 11, wherein the downlink control information is transmitted in a first downlink control information transmission in a first downlink control channel monitoring occasion of the first slot that triggers the first instance of the aperiodic tracking reference signal and the second instance of the aperiodic tracking reference signal.

16. The method of claim 15, wherein the aperiodic tracking reference signal is a first aperiodic tracking reference signal, and wherein the downlink control information is further transmitted in a second downlink control information transmission in a second downlink control channel monitoring occasion of the second slot that triggers one or more instances of a second aperiodic tracking reference signal in one or other slots.

17. The method of claim 16, wherein the first downlink control information transmission and the second downlink control information transmission both indicate the first transmission configuration indicator state, and wherein the UE assumes the first set of large scale transmission parameters are used for both the first aperiodic tracking reference signal and the second aperiodic tracking reference signal when measuring the first aperiodic tracking reference signal and the second aperiodic tracking reference signal.

18. The method of claim 11, wherein the downlink control information is transmitted in a first downlink control information transmission in a downlink control channel monitoring occasion of the first slot that triggers the first instance of the aperiodic tracking reference signal and the second instance of the aperiodic tracking reference signal within the second slot.

19. The method of claim 11, wherein the downlink control information is transmitted in both a first downlink control information transmission and a second downlink control information transmission that are provided in one or more downlink control channel monitoring occasions of one or more slots.

20. The method of claim 19, wherein:
the first downlink control information transmission and the second downlink control information transmission are both provided in the first downlink control channel monitoring occasion,
the first downlink control information transmission is provided in a first downlink control channel monitoring occasion and the second downlink control information transmission is provided in a second downlink control channel monitoring occasion that is consecutive to the first downlink control channel monitoring occasion, or
the first downlink control information transmission is provided in a first downlink control channel monitoring occasion and the second downlink control information transmission is provided in a second downlink control channel monitoring occasion that is non-consecutive to the first downlink control channel monitoring occasion, and wherein both the first downlink control channel monitoring occasion and the second downlink control channel monitoring occasion are in the first slot.

21. An apparatus for wireless communication at a user equipment (UE), comprising:
a processor,
memory coupled with the processor; and
instructions stored in the memory and executable by the processor to cause the apparatus to:
receive downlink control information that includes a first transmission configuration indicator state for at least a first slot, and that includes a trigger for an aperiodic tracking reference signal in at least the first slot;
measure a first instance of the aperiodic tracking reference signal in the first slot and a second instance of the aperiodic tracking reference signal in the first slot or a second slot; and
update one or more time tracking parameters, frequency tracking parameters, or combinations thereof based at least in part on a same first set of large scale transmission parameters being used for at least the first instance of the aperiodic tracking reference signal and the second instance of the aperiodic tracking reference signal, wherein the first set of large scale transmission parameters are different than a second set of large scale transmission parameters that are used for a periodic tracking reference signal.

22. The apparatus of claim 21, wherein the first transmission configuration indicator state indicates the first set of large scale transmission parameters.

23. The apparatus of claim 22, wherein the second set of large scale transmission parameters are semi-statically indicated by a second transmission configuration indicator state for the periodic tracking reference signal, and wherein the second transmission configuration indicator state is semi-statically indicated in one or more periodic synchronization signal blocks.

24. The apparatus of claim 21, wherein the first set of large scale transmission parameters include quasi co-location (QCL) parameters that are used for the first instance of the aperiodic tracking reference signal and the second instance of the aperiodic tracking reference signal.

25. The apparatus of claim 21, wherein the downlink control information is received in a first downlink control information transmission in a first downlink control channel monitoring occasion of the first slot that triggers the first instance of the aperiodic tracking reference signal and in a second downlink control information transmission in a second downlink control channel monitoring occasion of the second slot that triggers the second instance of the aperiodic tracking reference signal within the second slot.

26. An apparatus for wireless communication at an access network entity, comprising:
a processor,
memory coupled with the processor; and
instructions stored in the memory and executable by the processor to cause the apparatus to:
transmit, to a user equipment (UE), downlink control information that includes a first transmission configuration indicator state for at least a first slot, and that includes a trigger for an aperiodic tracking reference signal in at least the first slot and a second slot;
transmit a first instance of the aperiodic tracking reference signal in the first slot and a second instance of the aperiodic tracking reference signal in the second slot, wherein a same first set of large scale transmission parameters is used for both the first instance of the aperiodic tracking reference signal and the second instance of the aperiodic tracking reference signal, and wherein the first set of large scale transmission parameters are different than a second set of large scale transmission parameters that are used for a periodic tracking reference signal; and
receive a feedback report that includes one or more parameters that are determined based at least in part on the first instance of the aperiodic tracking reference signal and the second instance of the aperiodic tracking reference signal.

27. The apparatus of claim 26, wherein the first transmission configuration indicator state indicates the first set of large scale transmission parameters.

28. The apparatus of claim 26, wherein the second set of large scale transmission parameters are semi-statically indicated by a second transmission configuration indicator state for the periodic tracking reference signal, and wherein the second transmission configuration indicator state is semi-statically indicated in one or more periodic synchronization signal blocks.

29. The apparatus of claim 26, wherein the first set of large scale transmission parameters include quasi co-location (QCL) parameters that are used for the first instance of the aperiodic tracking reference signal and the second instance of the aperiodic tracking reference signal.

30. The apparatus of claim 26, wherein the downlink control information is transmitted in a first downlink control information transmission in a first downlink control channel monitoring occasion of the first slot that triggers the first instance of the aperiodic tracking reference signal and the second instance of the aperiodic tracking reference signal.

\* \* \* \* \*